(12) United States Patent
Yoshida

(10) Patent No.: US 10,976,629 B2
(45) Date of Patent: Apr. 13, 2021

(54) CURVED DISPLAY PANEL

(71) Applicant: SHARP KABUSHIKI KAISHA, Sakai (JP)

(72) Inventor: Masahiro Yoshida, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/475,355

(22) PCT Filed: Dec. 25, 2017

(86) PCT No.: PCT/JP2017/046302
§ 371 (c)(1),
(2) Date: Jul. 1, 2019

(87) PCT Pub. No.: WO2018/128106
PCT Pub. Date: Jul. 12, 2018

(65) Prior Publication Data
US 2019/0339555 A1     Nov. 7, 2019

(30) Foreign Application Priority Data
Jan. 6, 2017    (JP) .............................. JP2017-001129

(51) Int. Cl.
*G02F 1/1368* (2006.01)
*G02F 1/1362* (2006.01)
*G09F 9/30* (2006.01)

(52) U.S. Cl.
CPC ...... *G02F 1/1368* (2013.01); *G02F 1/136209* (2013.01); *G02F 1/136286* (2013.01); *G09F 9/30* (2013.01)

(58) Field of Classification Search
CPC ............ G02F 1/1368; G02F 1/136209; G02F 1/136286; G02F 1/134372; G02F 1/13394; G09F 9/30; H01L 27/3244–3279; H01L 51/5206–5218; H01L 27/1214–1296
See application file for complete search history.

(56) References Cited

U.S. PATENT DOCUMENTS

| 7,834,962 | B2 | 11/2010 | Satake et al. |
| 2009/0161048 | A1 | 6/2009 | Satake et al. |
| 2015/0317015 | A1* | 11/2015 | Eguchi ............... H01L 27/323 345/174 |

(Continued)

FOREIGN PATENT DOCUMENTS

JP    2009-150982 A    7/2009

*Primary Examiner* — Shahed Ahmed
(74) *Attorney, Agent, or Firm* — ScienBiziP, P.C.

(57) ABSTRACT

A curved liquid, crystal panel 10 having a display surface 10DS that is curved around a curvature axis CAX includes: a pair of substrates 10*a* and 10*b* disposed such that plate surfaces thereof are opposed to each other with a space therebetween; a first TFT 10*f*A provided on the array substrate 10*b*; a second TFT 10*f*B that is provided on the array substrate 10*b* and is disposed adjacent to the first TFT 10*f*A in a curvature direction orthogonal to the one curvature axis CAX and along the display surface 10DS; and a spacer 11 that is provided on the CF substrate 10*a* and are in contact with the array substrate 10*b* to keep the space between the pair of substrates 10*a* and 10*b* and is disposed to overlap at least one of the first TFT 10*f*A and the second TFT 10*f*B that adjacent to each other.

19 Claims, 21 Drawing Sheets

(56) References Cited

U.S. PATENT DOCUMENTS

2015/0318339 A1* 11/2015 Nakamura .......... H01L 51/5234
  257/98
2015/0372026 A1* 12/2015 Sato ...................... G06F 3/0446
  257/71
2017/0351141 A1* 12/2017 Kubota ............... G02F 1/13394

* cited by examiner

CURVED DISPLAY PANEL

TECHNICAL FIELD

The present invention relates to a curved display panel.

BACKGROUND

There has been conventionally known an example of a liquid crystal display device with a curved display surface that is described in Patent Document 1 below. In the liquid crystal display device described in Patent Document 1, the long side of a pixel structure is arranged along the curvature direction of a display surface, and a black matrix is provided on an opposed substrate with a black matrix opening of which the length along the curvature direction is $E-L\{(T1/2)+(T2/2)+d\}/R$ or less where the length of the display surface along the curvature direction is L, the thickness of a array substrate is T1, the thickness of the opposed substrate is T2, the dimension of a gap between the array substrate and the opposed substrate is d, the radius of curvature of the curved display surface is R, and the length of the long side of a pixel electrode provided in the pixel structure is E.

RELATED ART DOCUMENT

Patent Document

Patent Document 1: Japanese Unexamined Patent Application Publication No. 2009-150982

Problem to be Solved by the Invention

In the liquid crystal display device described in Patent Document 1, a spherical resin spacer agent is used to keep the space between the array substrate and the opposed substrate, that is, the cell gap. However, instead of the spherical resin spacer agent, a columnar photo spacer may be used in some cases. For example, the column photo spacer is provided on the opposed substrate such that its tip is in contact with the array substrate to keep the cell gap. However, curving the display surface produces variations in the contact position of the photo spacer to the array substrate, which results in an uneven cell gap that leads to display defects.

DISCLOSURE OF THE PRESENT INVENTION

The present invention has been made in view of the above circumstances. An object is to suppress the occurrence of display defects.

Means for Solving the Problem

A curved display panel according to the present invention is a curved display panel having a display surface displaying an image, and the display surface is curved around at least one curvature axis. The curved display panel includes: a pair of substrates disposed such that plate surfaces thereof are opposed to each other with a space therebetween; a first switching element provided on the first substrate of the pair of substrates; a second switching element that is provided on the first substrate and is disposed adjacent to the first switching element in a curvature direction orthogonal to the one curvature axis and along the display surface; and a spacer that is provided on the second substrate of the pair of substrates to keep a space between the pair of substrates and is disposed to overlap at least one of the first switching element and the second switching element that are adjacent to each other.

Accordingly, an image is displayed on the curved display surface based on driving of the first switching element and the second switching element. The space between the pair of substrates can be kept by the spacer provided on the second substrate of the pair of substrates of which the plate surfaces are opposed to each other with a space therebetween. The position of the spacer to the first substrate can be varied in the curvature direction due to the curvature of the curved display panel around the one curvature axis. This may cause variations in the space between the pair of substrates kept by the spacer.

In that respect, the first substrate has the second switching element adjacent to the first switching element in the curvature direction, and the spacer is disposed to overlap at least one of the first switching element and the second switching element. Accordingly, even if the position of the spacer to the first substrate varies in the curvature direction due to the curvature of the curved display panel around the one curvature axis, the spacer is hardly arranged not to overlap the first switching element or the second switching element. That is, the spacer is highly likely to overlap either the first switching element or the second switching element. Therefore, even if the first substrate has steps between an area overlapping the first switching element and the second switching element and an area not overlapping the first switching element or the second switching element, the space between the pair of substrates kept by the spacer hardly varies and becomes stable, so that the image displayed on the display surface is hardly uneven.

Embodiments of the present invention are preferably configured as follows:

(1) The spacer may include spacers that may be disposed dispersedly within a plane area of the display surface, and one spacer of the spacers disposed closest to the one curvature axis as seen in the curvature direction may be located on the first substrate at an intermediate position between the first switching element and the second switching element that are adjacent to each other. Accordingly, the space between the pair of substrates is favorably kept by the spacers that are dispersedly disposed in the plane of the display surface. Among the spacers, the spacer disposed closest to the one curvature axis as seen in the curvature direction hardly changes in position in the curvature direction to the first substrate before and after the curved display panel is curved. Even if such a change occurs, the amount of the change is minimal. Since the spacer disposed closest to the one curvature axis as seen in the curvature direction is located on the first substrate at the intermediate position between the first switching element and the second switching element adjacent to each other, even if the position of the spacer to the first substrate changes according to the arrangement of the spacers in the curvature direction with respect to the one curvature axis, the spacer is highly likely to overlap at least one of the first switching element and the second switching element. Accordingly, the space between the pair of substrates kept by the spacers further hardly varies.

(2) The first switching element and the second switching element that are adjacent to each other may be disposed with a space therebetween, and the space may be smaller than a dimension of the spacer as seen in the curvature direction. A portion between the first switching element and the second switching element adjacent to each other forms steps with respect to the first switching element and the second switching element. Even if the spacer overlaps the portion between the first switching element and the second switching element, a portion of the spacer overlaps at least one of the first switching element and the second switching element. Therefore, the spacer exhibits a proper space keeping function, so that the space between the pair of substrates further hardly varies.

(3) Each of the first switching element and the second switching element may include at least: a source electrode to which an image signal is supplied; a channel part that is made of a semiconductor material and is connected to the source electrode; and a drain electrode that is disposed with a space from the source electrode and is connected to the channel part. The source electrode and the drain electrode are connected together via the channel part while having the space therebetween and the space may be smaller than the dimension of the spacer as seen in the curvature direction. Accordingly, the image signal supplied to the source electrode is supplied to the drain electrode through the channel part made of a semiconductor material. A portion between the source electrode and the drain electrode connected together via the channel part forms steps with respect to the source electrode and the drain electrode. Even if the spacer overlaps the portion between the source electrode and the drain electrode, a portion of the spacer overlaps at least one of the source electrode and the drain electrode. Therefore, the spacer exhibits a proper space keeping function, so that the space between the pair of substrates further hardly varies.

(4) The first substrate may include: a first line part that extends along a direction intersecting with the curvature direction and is connected to the first switching element; a second line part that extends in parallel to the first line part and is disposed adjacent to the first line part with a space left from the first line part in the curvature direction and is connected to the second switching element; and an inter-line light shielding part that extends in parallel to the first line part and the second line part and is disposed to straddle both the first line part and the second line part. Accordingly, signals are supplied to the first switching element and the second switching element via the first line part and the second line part. A portion between the first line part and the second line part as seen in the curvature direction extends in parallel to the first line part and the second line part, and light leakage may occur from this portion. The light leakage is noticeable in the normally white mode, for example, when the curved display panel is used in a liquid crystal display device, but may also occur in the normally black mode. Since the inter-line light shielding part extends in parallel to the first line part and the second line part and is disposed to straddle both the first line part and the second line part as described above, light is unlikely to leak from the portion between the first line part and the second line part. In addition, the aperture ratio can be kept high as compared to the case where an inter-line light shielding part similar to the above is provided on the second substrate.

(5) The first substrate may include: a first pixel electrode that is disposed adjacent to the first line part on a side opposite to the second line part as seen in the curvature direction and is connected to the first switching element; a second pixel electrode that is disposed adjacent to the second line part on a side opposite to the first line part as seen in the curvature direction and is connected to the second switching element; and a common electrode that is disposed to overlap the first pixel electrode and the second pixel electrode while having an insulating film therebetween and to which a reference potential is supplied. The inter-line light shielding part may be made of a light-shielding and electrically-conductive material and is disposed in contact with the common electrode. Accordingly, the first pixel electrode and the second pixel electrode are charged based on driving of the first switching element and the second switching element. A potential difference is generated between the common electrode to which the reference potential is supplied and the first pixel electrode and the second pixel electrode based on voltage values of the charged first pixel electrode and second pixel electrode. Based on the potential difference, a predetermined gradation is displayed on the display surface. The inter-line light shielding part extending in parallel to the first line part and the second line part is made of a light-shielding and electrically-conductive material and is disposed in contact with the common electrode, which achieves a lower resistance of the common electrode. Thus, the common electrode can be stably kept at the reference potential, thereby suppressing the occurrence of display defects such as shadowing.

(6) Each of the first switching element and the second switching element may have at least: a source electrode to which an image signal is supplied; a channel part that is made of a semiconductor material and is connected to the source electrode; and a drain electrode that is disposed with a space left from the source electrode and is connected to the channel part. The first substrate may include a one-side inter-electrode light shielding part that is disposed to straddle both the source electrode and the drain electrode. Accordingly, the image signal supplied to the source electrode is supplied to the drain electrode through the channel part made of a semiconductor material. The one-side inter-electrode light shielding part is disposed on the first substrate to straddle both the source electrode and the drain electrode, which makes it possible to suppress irradiation of the channel part made of a semiconductor material at the portion between the source electrode and the drain electrode with external light. Accordingly, it is possible to reduce characteristic fluctuation of the switching elements, particularly leakage current that can occur in the switching elements in the off state.

(7) Each of the first switching element and the second switching element may have at least: a source electrode to which an image signal is supplied; a channel part that is made of a semiconductor material and connected to the source electrode; and a drain electrode that is disposed with a space from the source electrode and is connected to the channel part. The second substrate may include an other-side inter-electrode light shielding part that is arranged to overlap a range straddling both the source electrode and the drain electrode. Accordingly, the image signal supplied to the source electrode is supplied to the drain electrode through the channel part made of a semiconductor material. The other-side inter-electrode light shielding part is disposed on the second substrate to overlap a range straddling both the source electrode and the drain electrode, which suppresses irradiation of the channel part made of a semiconductor material at the portion between the source electrode and the drain electrode with external light. Accordingly, it is possible to reduce characteristic fluctuation of the switching elements, particularly leakage current that can occur in the switching elements in the off state.

(8) The first substrate may include pixel electrodes aligned along a direction intersecting with the curvature direction, and the second substrate may include an inter-pixel light shielding part that extends along the curvature direction and is disposed between the adjacent pixel electrodes. The other-side inter-electrode light shielding part may be formed by partially widening the inter-pixel light shielding part. Accordingly, by disposing the inter-pixel light shielding part between the pixel electrodes aligned along the direction intersecting with the curvature direction, light hardly leaks from the portion between the adjacent pixel electrodes. The other-side inter-electrode light shielding part is formed by partially widening the inter-pixel light shielding part, which makes it possible to reduce the cost for installing the other-side inter-electrode light shielding part.

(9) The first substrate may include first pixel electrodes and second pixel electrodes that are respectively connected to the first switching element and the second switching element and are aligned along the curvature direction. These first pixel electrodes and the second pixel electrodes may be aligned along a direction intersecting with the curvature direction. The second substrate may include color filters of different colors that are aligned along a direction intersecting with the curvature direction to overlap the first pixel electrodes and the second pixel electrodes. The color filters may extend along the curvature direction and may be disposed to straddle the first pixel electrodes and the second pixel electrodes. Accordingly, when the first pixel electrodes and the second pixel electrodes are charged by driving the first switching element and the second switching element, the amount of transmitted light of each of the color filters is controlled based on the voltage value, so that color display with a predetermined gradation is produced on the display surface. Even if the arrangement of the color filters on the first substrate with respect to the first pixel electrodes and the second pixel electrodes varies in the curvature direction due to the curvature of the curved display panel, the color filters of different colors are aligned along the direction intersecting with the curvature direction, extend along the curvature direction, and are disposed to straddle the first pixel electrodes and the second pixel electrodes, which makes color mixture less prone to occur.

(10) The first substrate may include: a first line part that extends along a direction intersecting with the curvature direction and is connected to the first switching element; and a second line part that extends in parallel to the first line part and is disposed adjacent to the first line part with a space left from the first line part in the curvature direction and is connected to the second switching element. The first line part and the second line part each may be supplied with a scanning signal. The first switching element and the second switching element each may have at least a gate electrode connected to the first line part and the second line part. The gate electrode of the first switching element may be disposed adjacent to the first line part on a side opposite to the second line part as seen in the curvature direction, and the gate electrode of the second switching element may be disposed adjacent to the second line part on a side opposite to the first line part as seen in the curvature direction. Accordingly, when scanning signals are supplied to the first line part and the second line part, the first switching element and the second switching element are driven based on the scanning signals. The gate electrodes of the first switching element and the second switching element, the first line part, and the second line part are aligned along the curvature direction, and the arrangement range of these components constitutes a fluctuation allowable range of the position of the spacer to the first substrate. Therefore, it is possible to absorb variations in the position of the spacer with respect to the first substrate due to the curvature of the curved display panel over a wider range, thereby stabilizing the space between the pair of substrates.

(11) The first switching element and the second switching element may be disposed with a space therebetween, and each of the first switching element and the second switching element may have at least a channel part that is made of a semiconductor material and overlaps the gate electrode with an insulating film therebetween. The channel part of the first switching element and the channel part of the second switching element may be coupled with each other. Accordingly, when the first switching element and the second switching element are driven based on scanning signals supplied to the first line part and the second line part, their respective channel parts are energized. A portion between the first switching element and the second switching element adjacent to each other forms steps with respect to the first switching element and the second switching element. However, the channel part of the first switching element and the channel part of the second switching element are provided to be coupled with each other, and thus the steps are reduced by the coupled portion. This improves the flatness of the portion of the first substrate overlapping the spacer, so that the space between the pair of substrates is more stabilized. Although the channel part of the first switching element and the channel part of the second switching element are coupled with each other, the first switching element and the second switching element are driven by the different scanning signals, which avoids the occurrence of a short-circuit between the first switching element and the second switching element.

(12) Each of the first switching element and the second switching element may have at least: a channel part that is made of a semiconductor material and overlaps the gate electrode via an insulating film; a source electrode that is connected to the channel part; and a drain electrode that is disposed with a space left from the source electrode and is connected to the channel part. The channel part may selectively have a portion positioned between the source electrode and the drain electrode as connection targets and a portion overlapping at least a portion of the source electrode and a portion of the drain electrode. Accordingly, the image signal supplied to the source electrode is supplied to the drain electrode through the channel part made of a semiconductor material. The semiconductor material to be the channel part does not have a portion protruding outward from the outer shape of the source electrode. Therefore, when the curved display panel is irradiated with external light, the external light is hardly applied to the semiconductor material to be the channel part on the source electrode side. If the semiconductor material to be the channel part has a portion protruding from the source electrode, when the amount of external light applied to the curved display panel fluctuates, the amount of light applied to the channel part also fluctuates. Accordingly, the electrostatic capacitance value between the source electrode and the gate electrode fluctuates to vary the video signal, which may result in display defects. In that respect, as described above, making the external light hard to apply to the semiconductor material to be the channel part on the source electrode makes it less prone to occur display defects even with fluctuations in the amount of irradiation light to the curved display panel (including, for example, the irradiation light of a backlight device to irradiate the curved display panel with light for display).

(13) The first substrate may include: a first line part that extends along a direction intersecting with the curvature direction and is connected to the first switching element; and a second line part that extends in parallel to the first line part, is disposed adjacent to the first line part with a space left from the first line part in the curvature direction, and is connected to the second switching element. The first line part and the second line part each may be supplied with an image signal. The first switching element and the second switching element each may have at least a source electrode connected to the first line part and the second line part. The source electrode of the first switching element may be disposed adjacent to the first line part on a side opposite to the second line part as seen in the curvature direction, and the source electrode of the second switching element may be disposed adjacent to the second line part on a side opposite to the first line part as seen in the curvature direction. Accordingly, when the first line part and the second line part are supplied with image signals, the image signals are supplied to the source electrodes of the first switching element and the second switching element. The source electrodes of the first switching element and the second switching element, the first line part, and the second line part are aligned along the curvature direction, and the arrangement range of these components constitutes a fluctuation allowable range of the position of the spacer to the first substrate. Therefore, it is possible to absorb variations in the position of the spacer with respect to the first substrate due to the curvature of the curved display panel over a wider range, thereby stabilizing the space between the pair of substrates.

(14) The first substrate may include: a first pixel electrode that is disposed adjacent to the first line part on a side opposite to the second line part as seen in the curvature direction and is connected to the first switching element; and a second pixel electrode that is disposed adjacent to the second line part on a side opposite to the first line part as seen in the curvature direction and is connected to the second switching element. The first pixel electrode and the second pixel electrode may have an approximately rectangular planar shape and may be disposed such that a long side direction thereof aligns with the curvature direction and a short side direction thereof aligns with an extending direction of the first line part and the second line part. Accordingly, when the first line parts and the second line parts are disposed, for example, the space between the first line part and the second line part is determined based on the long side dimension of the first pixel electrode and the second pixel electrode. Therefore, the numbers of the first line parts and the second line parts in the curvature direction of the curved display panel can be decreased as compared to a case where the long side direction of the first pixel electrode and the second pixel electrode aligns with the extending direction of the first line part and the second line part and the short side direction of the first pixel electrode and the second pixel electrode aligns with the curvature direction. As a result, the number of image signals supplied to the first line parts and the second line parts can be decreased to reduce the manufacturing cost of the curved display panel.

(15) The first substrate may include a third line part that extends along the curvature direction and is connected to the first switching element and the second switching element and is supplied with a scanning signal. Each of the first switching element and the second switching element may have at least a channel part that is made of a semiconductor material and is connected to at least the source electrode. Each of the source electrode and the channel part may have a source electrode extension portion and a channel extension portion, respectively, that extend along the curvature direction and overlap a portion of the third line part. Accordingly, when the first switching element and the second switching element are driven based on scanning signal supplied to the third line part, image signals to be supplied to the first line part and the second line part are supplied to the channel parts of the first switching element and the second switching element. The source electrode and the channel part have respectively the source electrode extension portion and the channel extension portion, respectively, that extend along the curvature direction and overlap a portion of the third line part, which makes it possible to extend the fluctuation allowable range of the position of the spacer to the first substrate by the source electrode extension portion and the channel extension portion. Therefore, it is possible to absorb variations in the position of the spacer with respect to the first substrate due to the curvature of the curved display panel over a wider range, thereby stabilizing the space between the pair of substrates.

Advantageous Effect of the Invention

According to the present invention, it is possible to suppress occurrence of display unevenness.

MODES FOR CARRYING OUT THE INVENTION

First Embodiment

Figure 1:
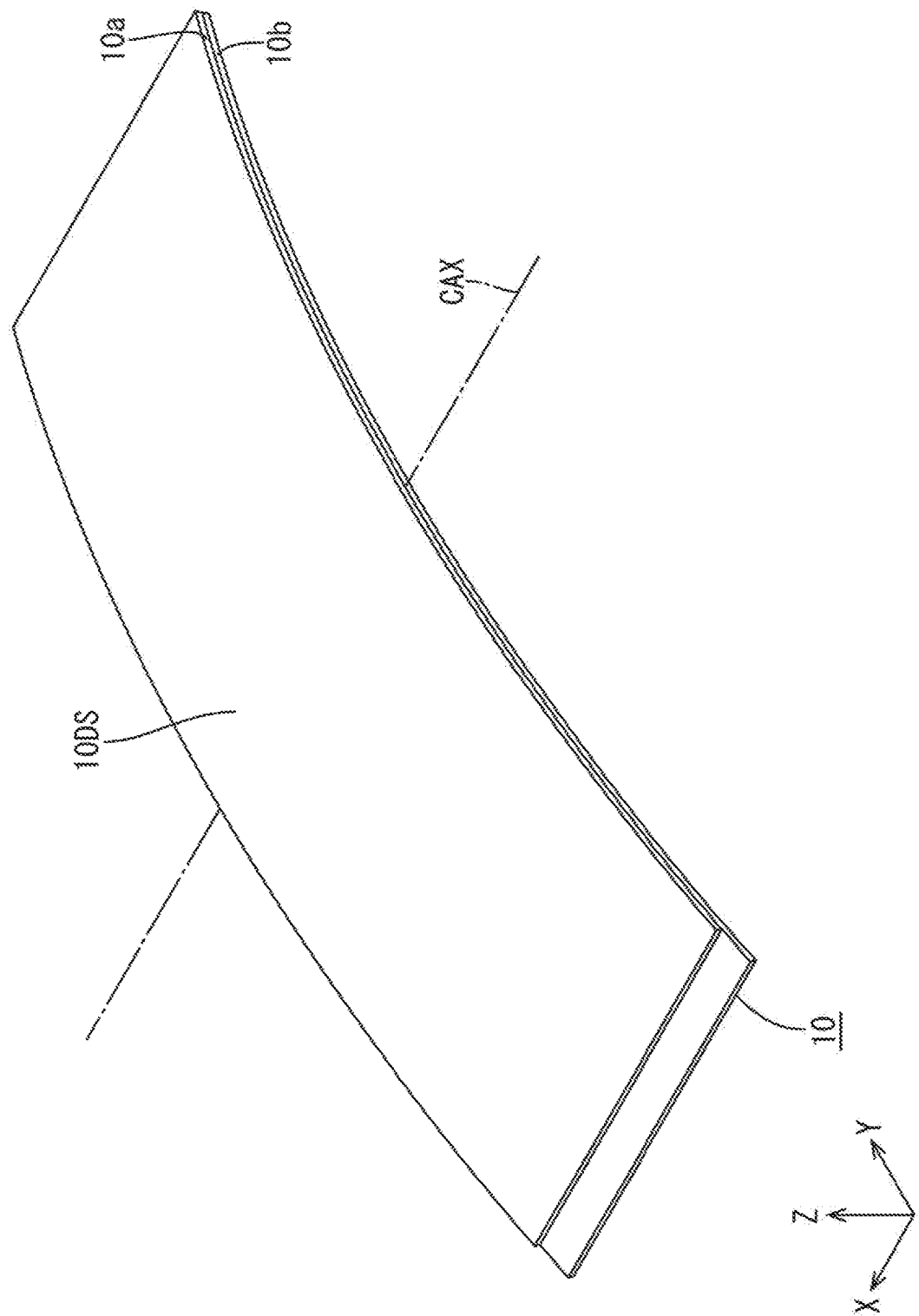
FIG. 1 is a schematic perspective view of a curved liquid crystal panel according to a first embodiment of the present invention.

A first embodiment of the present invention will be described with reference to FIGS. 1 to 8. In the present embodiment, a curved liquid crystal panel 10 provided in a liquid crystal display device will be exemplified. Some of the drawings indicate an X axis, a Y axis, and a Z axis, such that the directions of these axes align with the directions illustrated in the drawings. The upward and downward directions are determined with reference to FIGS. 2 and 3, such that the upper parts of the drawings indicate the front side, and the lower parts of the drawings indicate the back side.

As illustrated in FIG. 1, the curved liquid crystal panel (curved display panel) 10 has a curved display surface 10DS on which an image is displayed. Illumination light emitted from a backlight device (lighting device) as an external light source not illustrated is used to display an image on the curved display surface 10DS. The curved liquid crystal panel 10 forms a liquid crystal display device together with the backlight device and the like. The liquid crystal display device according to the present embodiment is preferably used for an in-vehicle application such as a car navigation system, for example. The screen size of the curved liquid crystal panel 10 is preferably about 28.2 inches, for example, but the present invention is not necessarily limited thereto.

As illustrated in FIG. 1, the curved liquid crystal panel 10 has a longitudinally elongated square shape (rectangular shape, longitudinal shape) as a whole. Its central portion as seen in a long side direction protrudes to the front side, and its both ends as seen in the long side direction are curved in an approximately arcuate shape retracted to the back side, and its cross section is approximately C-shaped. In the curved liquid crystal panel 10, a short side direction coincides with the X-axis direction illustrated in the drawings, the long side direction coincides with the Y-axis direction illustrated in the drawings, and a plate thickness direction coincides with the Z axis direction illustrated in the drawings. In the curved liquid crystal panel 10, a curvature axis CAX has an axis direction coincident with the short side direction (X-axis direction) of the curved liquid crystal panel 10, and a curvature direction orthogonal to the curvature axis CAX and aligned with the display surface 10DS (the direction in which the curvature of the display surface 10DS changes) coincides with the long side direction (Y-axis direction) of the curved liquid crystal panel 10. The radius of curvature of the curved liquid crystal panel 10 is preferably about 2000 mm, for example, but it is not necessarily limited thereto. In the present embodiment, although is not illustrated in the drawings, the backlight device preferably has a curved shape following the curved liquid crystal panel 10, but the present invention is not necessarily limited thereto.

Figure 2:
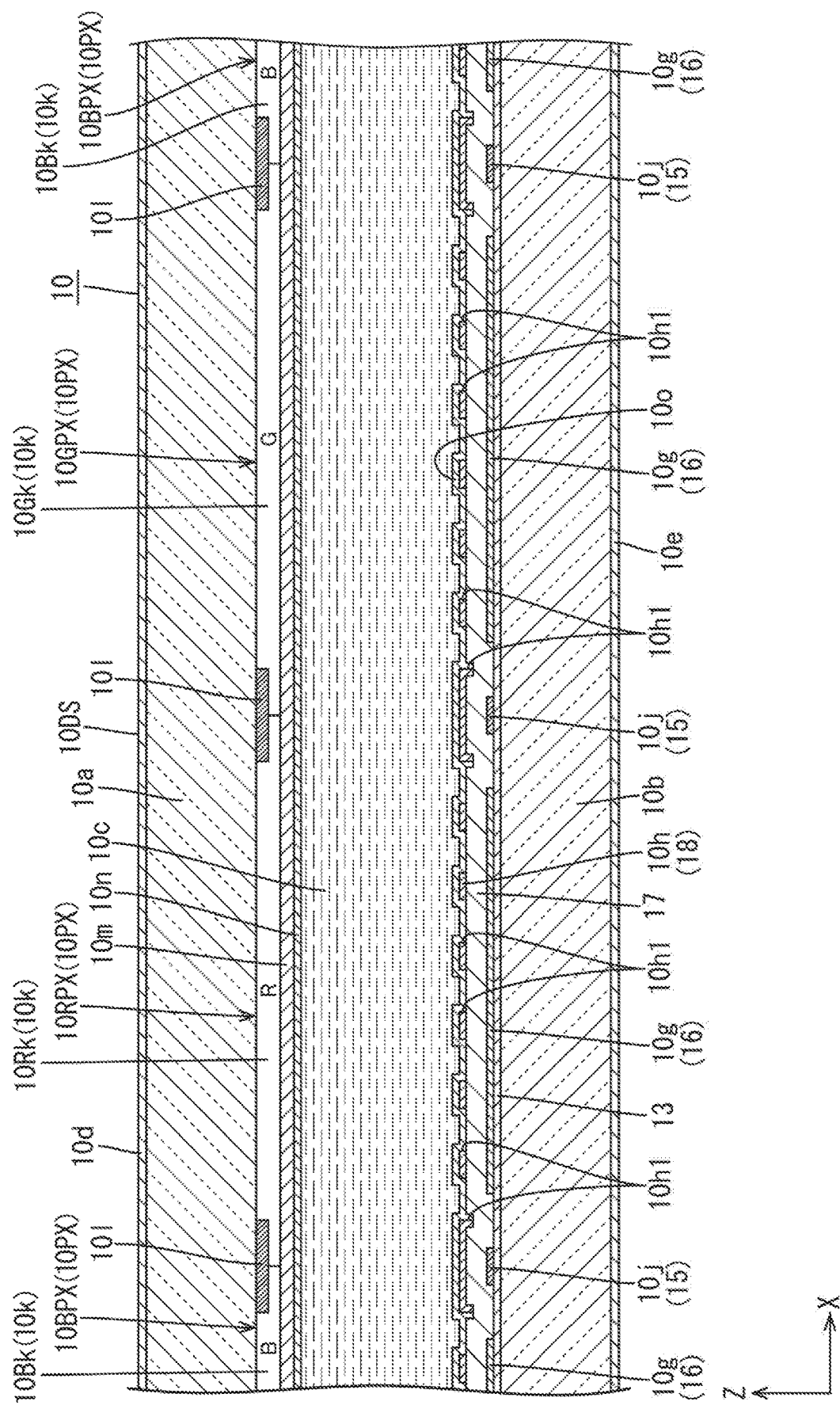
FIG. 2 is a cross-sectional view of the curved liquid crystal panel taken along a short side direction.

As illustrated in FIG. 2, the curved liquid crystal panel 10 includes at least a pair of glass substrates 10a and 10b that is almost transparent and is excellent in light transmittance and a liquid crystal layer 10c that is interposed between the substrates 10a and 10b and contains liquid crystal molecules as a substance of which the optical properties are changed due to application of an electric field. The substrates 10a and 10b are bonded together by a sealant (not illustrated) in a state where a cell gap corresponding to the thickness of the liquid crystal layer 10c is maintained. Of the pair of substrates 10a and 10b constituting the curved liquid crystal panel 10, a CF substrate (opposed substrate) 10a is on the face side (front side), and an array substrate (active matrix substrate, TFT substrate) 10b is on the back side (rear side). As illustrated in FIG. 1, the CF substrate 10a has a long side dimension shorter than a long side dimension of the array substrate 10b. The CF substrate 10a is bonded to the array substrate 10b such that one end of the CF substrate 10a aligns with one end of the array substrate 10b as seen in the long side direction. Therefore, the other end of the array substrate 10b as seen in the long side direction protrudes beyond the CF substrate 10a. The protruding portion is connected to a flexible substrate (not illustrated) relayed to a signal supply source. Each of the CF substrate 10a and the array substrate 10b is formed by laminating various films on the inner side of the glass substrate. Polarizing plates 10d and 10e are attached to the outer surfaces of the substrates 10a and 10b, respectively. Each of the glass substrates, the CF substrate 10a and the array substrate 10b, preferably has a plate thickness of about 0.1 mm, for example, but the plate thickness is not necessarily limited thereto. The curved liquid crystal panel 10 is divided into a display area in the center of the screen where an image is to be displayed and a non-display area in the outer periphery of the screen that forms a frame shape surrounding the display area and where no image is to be displayed. The display area has a vertically elongated rectangular shape similarly to the curved liquid crystal panel 10, and the long side dimension thereof is about 691 mm, for example, but this is not necessarily limited thereto.

Figure 4:
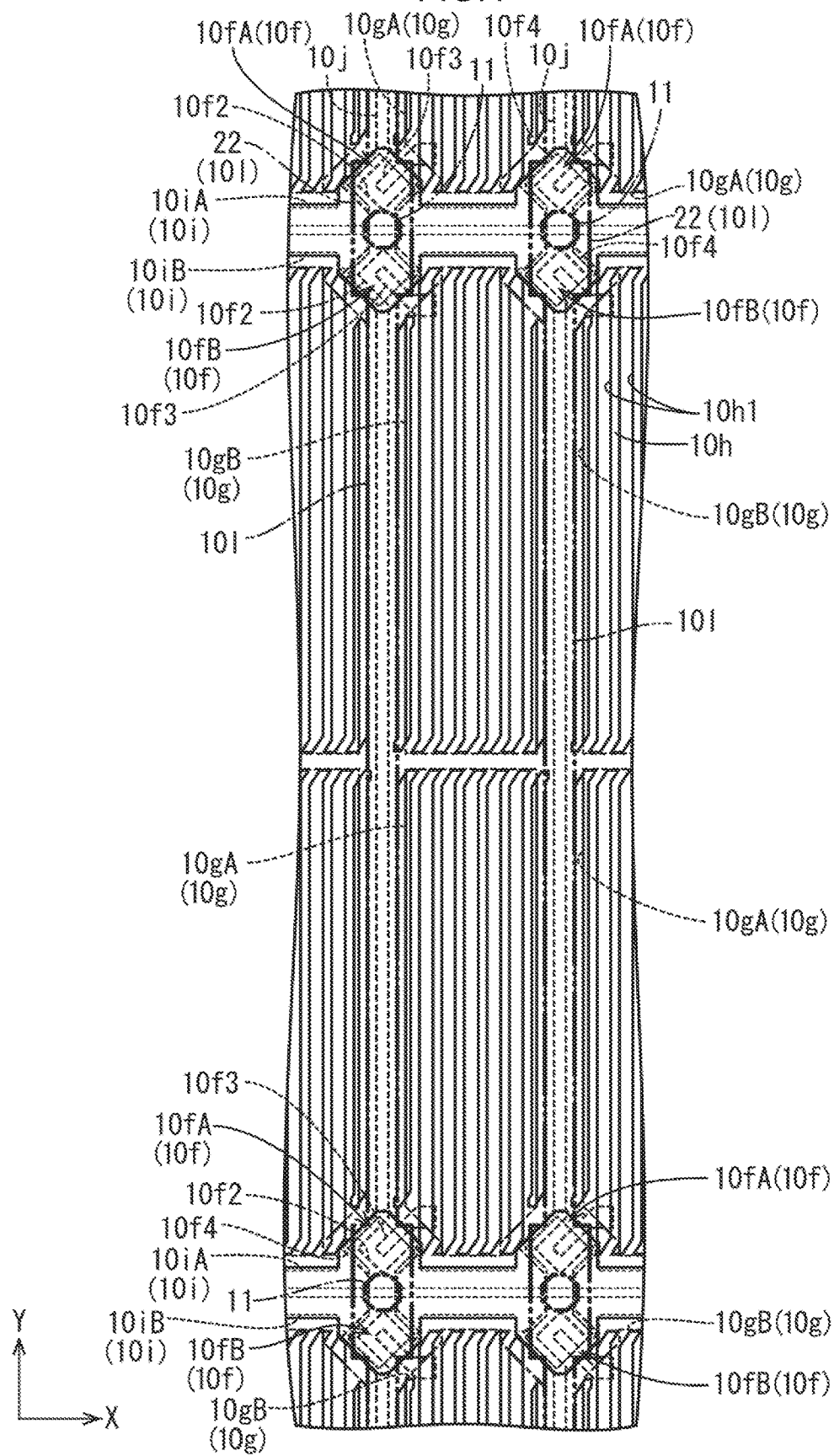
FIG. 4 is a plan view illustrating a line configuration in a display area of an array substrate constituting the curved liquid crystal panel.

As illustrated in FIGS. 2 and 4, in the display area on the inner side (the liquid crystal layer 10c side, the side opposed to the CF substrate 10a) of the array substrate 10b, large numbers of TFTs (first switching elements and second switching elements) 10f and pixel electrodes 10g (first pixel electrodes 10gA and second pixel electrodes 10gB) are aligned in a matrix (row-and-column form) along the X-axis direction and the Y-axis direction. In addition, gate lines (scanning lines, the first line part and the second line part) 10i and source lines (data lines, signal lines) 10j in a grid pattern to surround the TFTs 10f and the pixel electrodes 10g. The gate lines 10i extend along the X-axis direction, that is, the axial direction of the curvature axis CAX, and the source lines 10j extend along the Y-axis direction, that is, the curvature direction. The gate lines 10i and the source lines 10j are respectively connected to gate electrodes 10f1 and source electrodes 10f2 of the TFTs 10f, and the pixel electrodes 10g are connected to drain electrodes 10f3 of the TFTs 10f. The TFTs 10f are driven based on various signals supplied to the gate lines 10i and the source lines 10j. Along with the driving of the TFTs 10f, the supply of potentials to the pixel electrodes 10g is controlled. The pixel electrodes 10g have a vertically elongated, approximately square planar shape. The long side direction of the pixel electrodes 10g aligns with the Y-axis direction (the long side direction of the curved liquid crystal panel 10, the curvature direction) and the short side direction of the pixel electrodes 10g aligns with the X-axis direction (the axial direction of the curvature axis CAX). On the inner side of the display area of the array substrate 10b, a common electrode 10h is formed on the upper layer side than the pixel electrodes 10g (the side closer to the liquid crystal layer 10c) to overlap the pixel electrodes 10g. The common electrode 10h is always supplied with a substantially constant reference potential and extends over almost the entire display area. The common electrode 10h has vertically elongated slits 10h1 formed in the portions overlapping the pixel electrodes 10g. When a potential difference occurs between the pixel electrodes 10g and the common electrode 10h overlapping each other along with the charging of the pixel electrodes 10g, a fringe electric field (oblique electric field) including a component along the plate surface of the array substrate 10b and a component in a direction normal to the plate surface of the array substrate 10b is applied to the liquid crystal layer 10c. That is, the operating mode of the curved liquid crystal panel 10 according to the present embodiment is a fringe field switching (FFS) mode.

Figure 5:
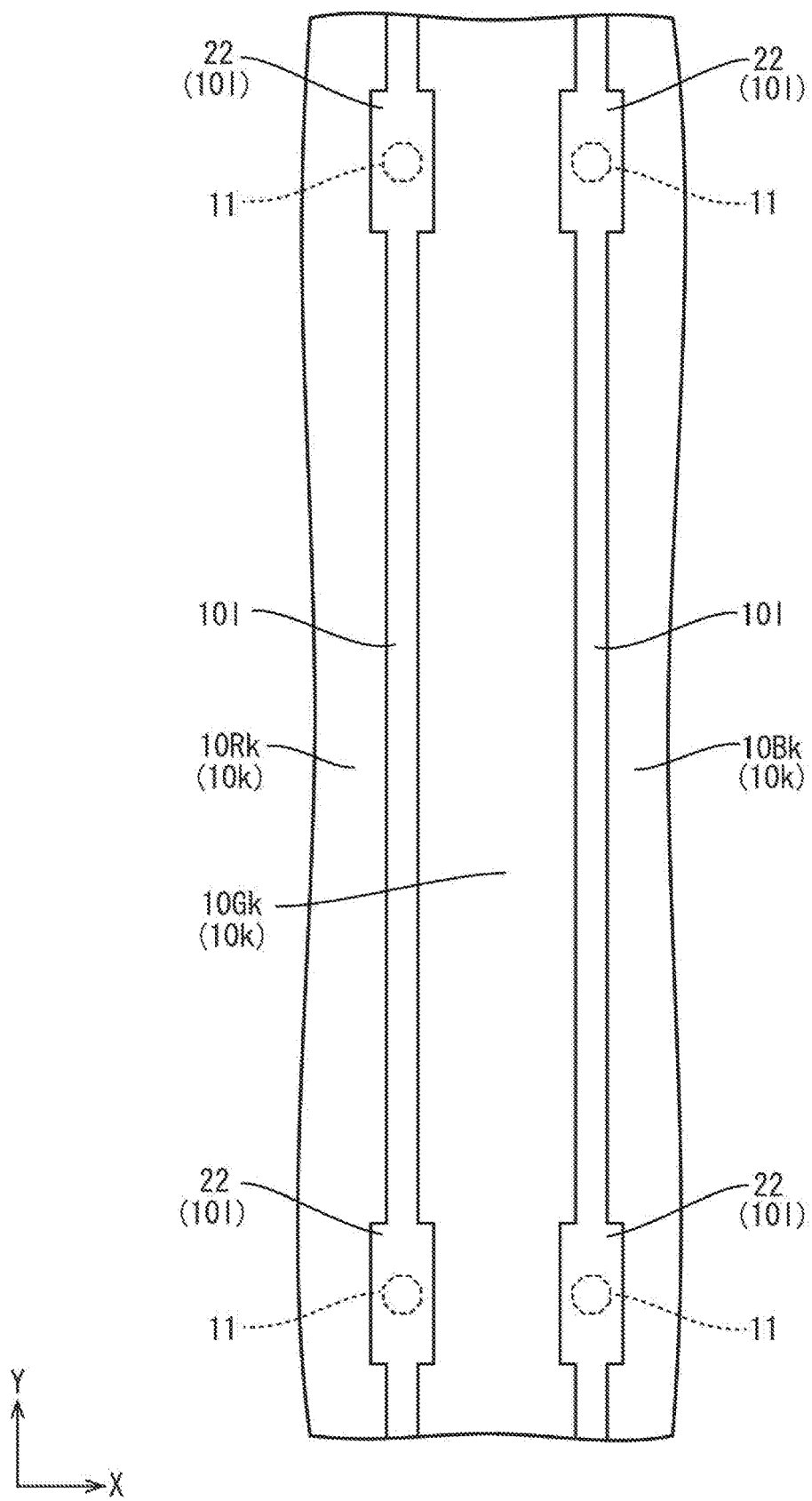
FIG. 5 is a plan view illustrating a configuration in a display area of a CF substrate constituting the curved liquid crystal panel.

On the other hand, as illustrated in FIGS. 2 and 5, in the display area on the inner side of the CF substrate 10a (the liquid crystal layer 10c side, the side opposed to the array substrate 10b), a large number of color filters (colored portions) 10k is provided at positions opposed to the pixel electrodes 10g on the array substrate 10b. The color filters 10k and the pixel electrodes 10g opposed to each other constitute pixel parts 10PX. The color filters 10k include red color filters (red colored portions) 10Rk in red color, green color filter (green colored portions) 10Gk in green color, and blue color filters (blue colored portions) 10Bk in blue color. These filters of the three colors are repeatedly disposed in a predetermined order along the X-axis direction. The color filters 10k contain pigments corresponding to the colors to be exhibited, and absorb light of colors not to be exhibited by the pigments, thereby selectively transmitting light of colors to be exhibited (light of specific colors) The arrangement of the color filters 10Rk, 10Gk, and 10Bk matches the arrangement of the pixel electrodes 10g on the array substrate 10b. The color filters 10Rk, 10Gk, and 10Bk form pixel parts 10RPX, 10GPX, and 10BPX of the three colors R, G, and B together with the opposed pixel electrodes 10g. In the curved liquid crystal panel 10, the pixel parts 10RPX, 10GPX, and 10BPX of the three colors R, G, and B adjacent to one another along the X-axis direction form display pixels for color display with a predetermined gradation. A large number of display pixels are disposed along the X-axis direction and the Y-axis direction in the plane of the display surface 10DS. On the other hand, the color filters 10Rk, 10Gk, and 10Bk extend over almost the entire length of the display area along the Y-axis direction and are disposed to straddle (traverse) all the large number of pixel electrodes 10g aligned along the Y-axis direction. That is, the large number of pixel parts 10RPX, 10GPX, and 10BPX in the respective colors are disposed by the same color along the Y-axis direction. In the present embodiment, the short side dimension of the pixel parts 10PX is about 60 μm, for example, and the long side dimension of the pixel parts 10PX is about 180 μm, for example. However, the present invention is not necessarily limited thereto. In the present embodiment, the number of display pixels aligned in the long side direction of the curved liquid crystal panel 10 is 3840, for example, and the number of display pixels aligned in the short side direction of the curved liquid crystal panel 10 is 1080, for example. However, the present invention is not necessarily limited thereto.

As illustrated in FIGS. 2 and 5, inter-pixel light shielding parts (black matrix) 10l are formed on the CF substrate 10a to partition the color filters 10k (pixel parts 10PX) adjacent to each other in the X-axis direction. The inter-pixel light shielding parts 10l are made of a light shielding material with a black surface, and divide the pixel parts 10PX that are adjacent to each other in the X-axis direction and exhibit different colors. This makes it possible to prevent color mixture between the pixel parts 10PX of different colors, thereby ensuring the independence of gradation of the pixel parts 10PX. The inter-pixel light shielding parts 10l extend over almost the entire length of the display area along the Y-axis direction and are arranged to overlap the source lines 10j on the array substrate 10b in a plan view. An overcoat film 10m is provided on the surfaces of the color filters 10k and the inter-pixel light shielding parts 10l. On the surface of the overcoat film 10m, the spacers 11 described below are provided. Further, alignment films 10n and 10o for orienting liquid crystal molecules included in the liquid crystal layer 10c are formed on the innermost sides (near the liquid crystal layer 10c) of both the substrates 10a and 10b and are in contact with the liquid crystal layer 10c. The liquid crystal layer 10c can be a liquid crystal material having positive or negative dielectric constant anisotropy, and the alignment films 10n and 10o can be horizontal alignment films or vertical alignment films. In the present embodiment, a liquid crystal material with positive dielectric constant anisotropy and horizontal alignment film are used. The horizontal alignment films are subjected to orientation processing (rubbing or the like) for setting initial orientation of liquid crystal molecules (orientation without application of voltage).

Figure 3:
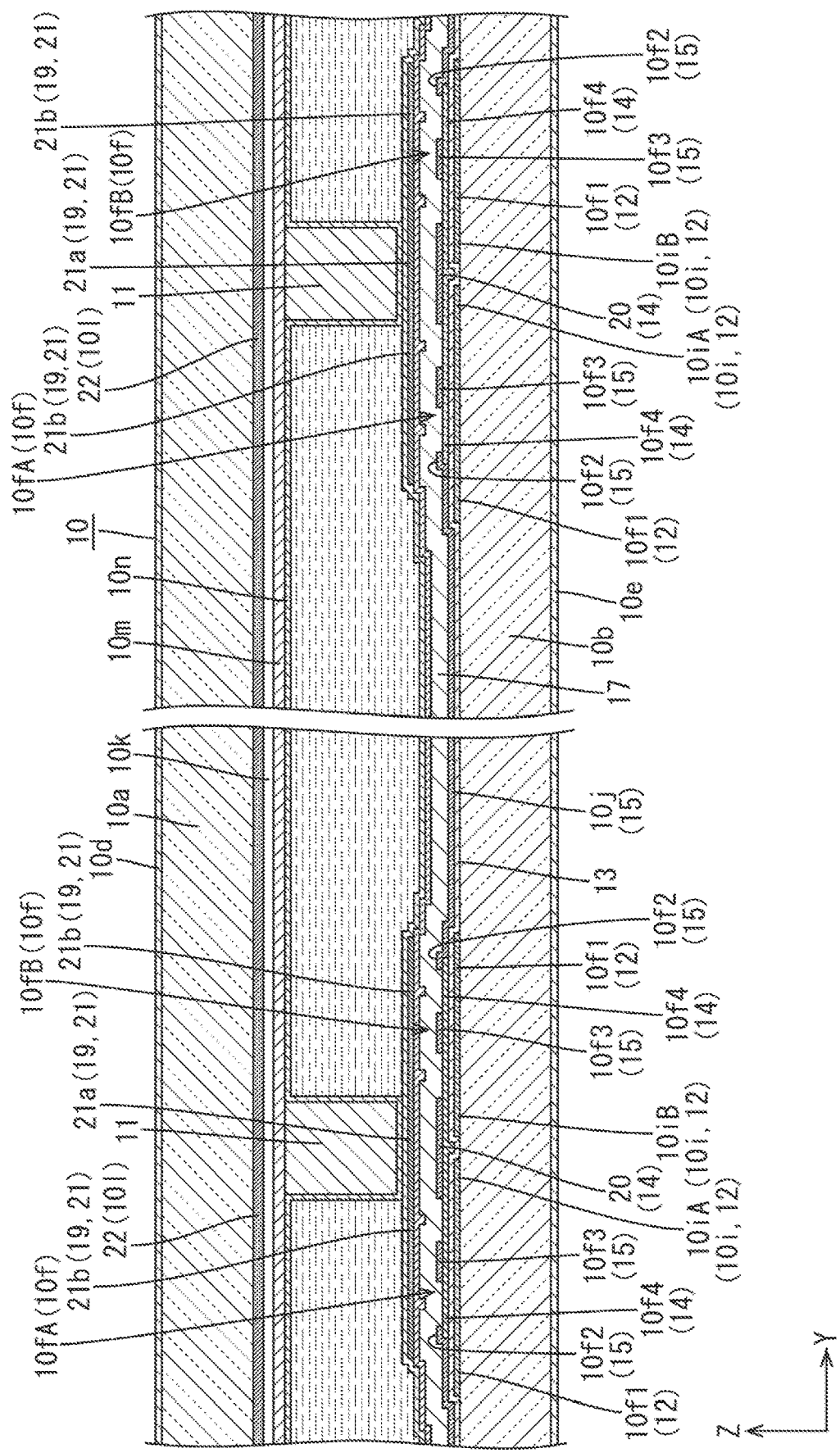
FIG. 3 is a cross-sectional view of the curved liquid crystal panel taken along a long side direction.
Figure 6:
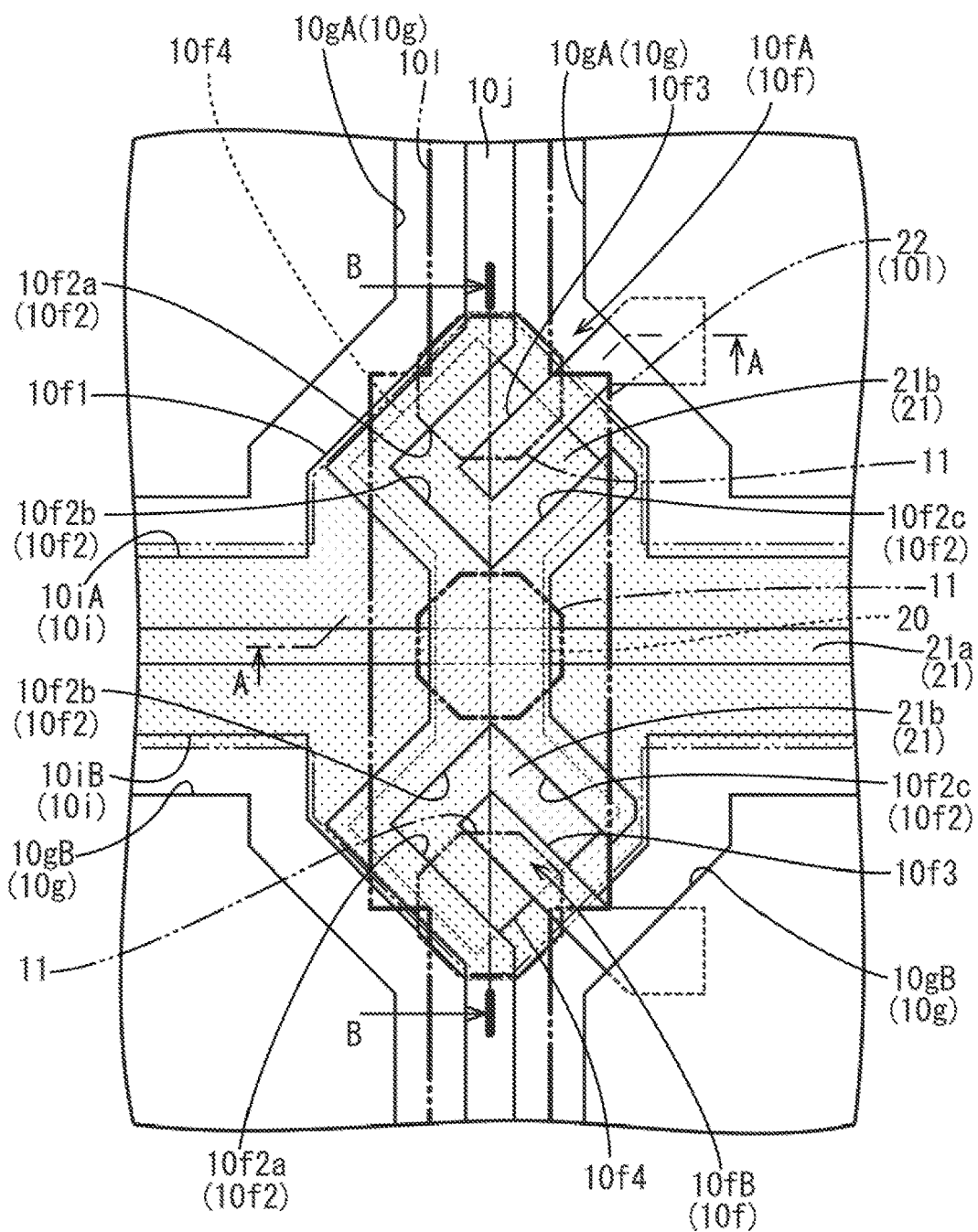
FIG. 6 is an enlarged plan view of TFTs and their vicinities in the display area of the array substrate.

As illustrated in FIG. 3, the spacers 11 are interposed between the pair of substrates 10a and 10b to keep the space therebetween. Specifically, each of the spacers 11 has a columnar shape that protrudes from the overcoat film 10m toward the array substrate 10b in a manner penetrating the liquid crystal layer 10c on the CF substrate 10a. The protruding end portion of each of the spacers 11 is brought into contact with the alignment film 10e on the innermost side of the opposed array substrate 10b, thereby to keep constant the space between the pair of substrates 10a and 10b in the display area, that is, the cell gap (the thickness of the liquid crystal layer 10c). Although described later in detail, a large number of the spacers 11 are dispersedly arranged with regularity within the display area in the plane of the display surface 10DS. The spacers 11 are made of a substantially transparent photosensitive resin material, for example, and are formed by patterning through a known photolithography method in the manufacturing process of the CF substrate 10a. In addition, each of the spacers 11 according to the present embodiment has an approximately octagonal planar shape as illustrated in FIG. 6. However, the present invention is not necessarily limited thereto. For example, in some cases, the planar shape may be a polygonal shape other than a regular octagonal shape, an approximately circular shape, an elliptical shape, or the like. All the spacers 11 dispersedly arranged in the plane of the display surface 10DS are necessarily not in contact with the array substrate 10b. For example, some of the spacers 11 may not be in contact with the array substrate 10b but may not be in contact with the array substrate 10b.

Figure 7:
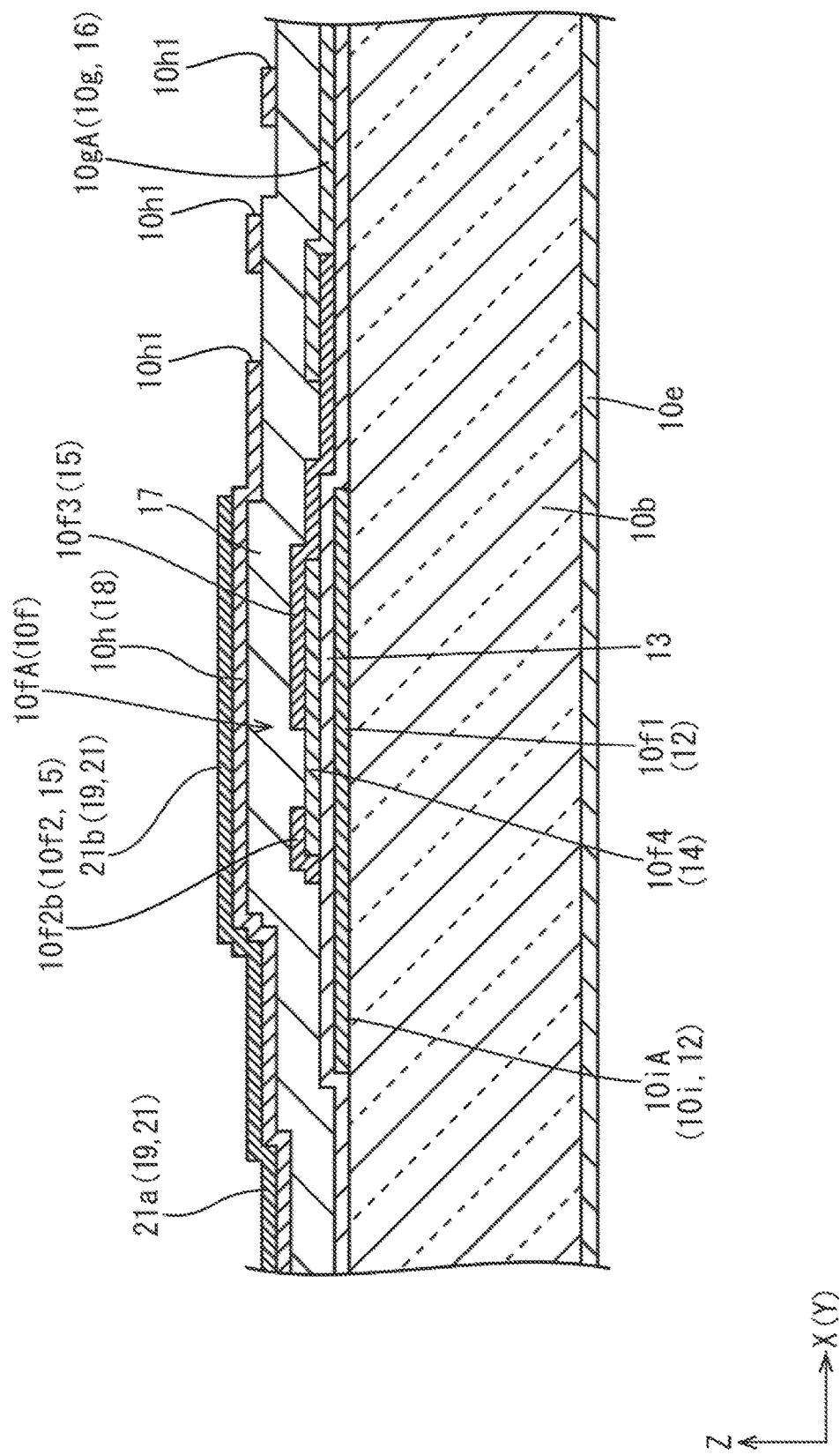
FIG. 7 is a cross-sectional view of FIG. 6 taken along line A-A.

Subsequently, various films laminated on the inner side of the array substrate 10b will be described. As illustrated in FIG. 7, laminated on the array substrate 10b are a first metal film (first conductive film) 12, a gate insulating film (insulating film, first insulating film) 13, a semiconductor film 14, a second metal film (second conductive film) 15, a first transparent electrode film (third conductive film, transparent electrode film) 16, an inter-layer insulating film (insulating film, second insulating film) 17, a second transparent electrode film (fourth conductive film, transparent electrode film) 18, a third metal film (fifth conductive film, light-shielding film) 19, and the alignment film 10o in order from the lower side (glass substrate side, side distant from the liquid crystal layer 10c).

The first metal film 12 has electrically-conductive and light-shielding properties by being formed from a single layer film made of one kind of metal material or a laminated film or alloy made of different kinds of metal materials. The first metal film 12 constitutes the gate lines 10i, the gate electrodes 10f1 of the TFTs 10f, and the like, as illustrated in FIGS. 3 and 7. The gate insulating film 13 is made of an inorganic material such as a silicon oxide film or a silicon nitride film to keep the first metal film 12 on the lower layer side and the semiconductor film 14 and the second metal film 15 on the upper layer side in an insulated state. The semiconductor film 14 is a thin film of amorphous silicon or oxide semiconductor, for example, and constitutes the channel parts 10f4 of the TFTs 10f connected to the source electrodes 10f2 and the drain electrodes 10f3. Similarly to the first metal film 12, the second metal film 15 has electrically-conductive and light-shielding properties by being formed from a single layer film or a laminated film or an alloy made of one or more kinds of metal materials. The second metal film 15 constitutes the source lines 10j, the source electrodes 10f2 and the drain electrodes 10f3 of the TFTs 10f, and others as illustrated in FIGS. 2 and 7. The first transparent electrode film 16 is made of a transparent electrode material (for example, indium tin oxide (ITO) or the like) and constitutes the pixel electrodes 10g. The inter-layer insulating film 17 is made of an inorganic material such as a silicon oxide film or a silicon nitride film and keeps the second metal film 15 and the first transparent electrode film 16 on the lower layer side and the second transparent electrode film 18 on the upper layer side in an insulated state. Similarly to the first transparent electrode film 16, the second transparent electrode film 18 is made of a transparent electrode material and constitutes the common electrode 10h. Similarly to the first metal film 12 and the second metal film 15, the third metal film 19 has electrically-conductive and light-shielding properties by being formed from a single layer film or a laminated film or an alloy made of one or more kinds of metal materials (for example, Cu, Al, Mo, Ti, and the like). The third metal film 19 constitutes a light shielding part 21 described later.

Subsequently, the arrangement of the gate lines 10i, the TFTs 10f, and the pixel electrodes 10g in the display area of the array substrate 10b will be described in detail. As illustrated in FIG. 4, the two gate lines 10i are aligned adjacent to each other with a predetermined space therebetween in the Y-axis direction, and constitute one set. Hereinafter, among the two gate lines 10i adjacent to each other in the Y-axis direction, the upper gate line 10i illustrated in FIG. 4 will be referred to as "first gate line (first line part)" and the suffix A will be added to the reference symbol, and the gate line 10i adjacent to the first gate line 10iA on the lower side in FIG. 4 will be referred to as "second gate line (second line part)" and the suffix B will be added to the reference symbol. No suffixes will be added to the reference symbols when the gate lines 10i are not differentiated but are collectively called. The space between the first gate line 10iA and the second gate line 10iB is narrower than the line width of the gate lines 10i, for example, about 3 µm. However, the present invention is not necessarily limited thereto.

As illustrated in FIG. 4, similarly to the gate lines 10i, the two TFTs 10f are aligned adjacent to each other with a predetermined space therebetween in the Y-axis direction, and constitute one set. Hereinafter, among the two TFTs 10f adjacent to each other in the Y-axis direction, the upper TFT 10f illustrated in FIG. 4 will be referred to as "first TFT (first switching element)" and the suffix A will be added to the reference symbol, and the TFT 10f adjacent to the first TFT 10fA on the lower side in FIG. 4 will be referred to as "second TFT (second switching element)" and the suffix B will be added to the reference symbol. No suffixes will be added to the reference symbols when the TFTs 10f are not differentiated but are collectively called. The space between the first TFT 10fA and the second TFT 10fB is substantially equal to the space between the two gate lines 10iA and 10iB described above. The first TFT 10fA is connected to the first gate line 10iA and is driven based on a scanning signal supplied to the first gate line 10iA, whereas the second TFT 10fB is connected to the second gate line 10iB and is driven based on a scanning signal supplied to the second gate line 10iB. Therefore, the first TFT 10fA and the second TFT 10fB are driven at different timings. On the other hand, the same (common) source line 10j is connected to the first TFT 10fA and the second TFT 10fB.

As illustrated in FIG. 4, the two pixel electrodes 10g are arranged back to back as seen in the Y-axis direction with the adjacent first gate line 10iA and second gate line 10iB in the same set sandwiched therebetween, and constitute one set. Hereinafter, the pixel electrode 10g adjacent to the first gate line 10iA as seen in the Y-axis direction on the side opposite to the second gate line 10iB (the upper side in FIG. 4) will be referred to as "first pixel electrode" and the suffix A will be added to the reference symbol, and the pixel electrode 10g adjacent to the second gate line 10iB as seen in the Y-axis direction on the side opposite to the first gate line 10iA (the lower side in FIG. 4) will be referred to as "second pixel electrode" and the suffix B will be added to the reference symbol. No suffixes will be added to the reference symbols when the pixel electrodes 10g are not differentiated but are collectively called. The first pixel electrode 10gA is connected to the first TFT 10fA and is charged to a predetermined voltage value (potential) based on an image signal supplied to the source line 10j. Similarly, the second pixel electrode 10gB is connected to the second TFT 10fB and is charged to a predetermined voltage value based on an image signal supplied to the source line 10j. On the side opposite to the first gate line 10iA (the upper side in FIG. 4) as a connection target to be connected to the first pixel electrode 10gA in the Y-axis direction, the second pixel electrode 10gB connected to the second gate line 10iB in another set aligned on the upper side in FIG. 4 is disposed with respect to the first gate line 10iA as a connection target. Similarly, on the side opposite to the second gate line 10iB (the lower side in FIG. 4) as a connection target to be connected to the second pixel electrode 10gB in the Y-axis direction, the first pixel electrode 10gA connected to the first gate line 10iA in another set of aligned on the lower side in FIG. 4 is disposed with respect to the second gate line 10iB as a connection target. That is, among the large number of pixel electrodes 10g aligned along the Y-axis direction, two pixel electrodes 10g adjacent to each other with the gate line 10i interposed therebetween are connected to the first gate line 10iA and the second gate line 10iB adjacent to each other in the Y-axis direction in the same set, whereas two pixel electrodes 10g adjacent to each other without the gate line 10i interposed therebetween are connected to the first gate line 10iA and the second gate line 10iB in different sets not adjacent to each other in the Y-axis direction. Therefore, the two pixel electrodes 10g aligned along the Y-axis direction are sandwiched between the first gate line 10iA and the second gate line 10iB in different sets.

The spacers 11 according to the present embodiment will be described in detail. As illustrated in FIGS. 3 and 4, each of the spacers 11 is disposed to overlap at least one of the first TFT 10fA and the second TFT 10fB adjacent to each other in the Y-axis direction (curvature direction). In FIG. 4, the formation ranges of the spacers 11 and the inter-pixel light shielding parts 10l are indicated by two-dot chain lines. In the process of manufacture, the curved liquid crystal panel 10 is curved around the curvature axis CAX from the flat state of the display surface 10DS. However, due to deformation of the curved liquid crystal panel 10, the positions of the spacers 11 in contact with the array substrate 10b (in a plan view) may vary in the curvature direction. In this respect, by designing each of the spacers 11 to overlap at least one of the first TFT 10fA and the second TFT 10fB as described above, the spacer 11 is less prone to contact the array substrate 10b at a position not overlapping the first TFT 10fA or the second TFT 10fB. Accordingly, the spacer 11 is highly likely to contact the array substrate 10b at a position overlapping either of the first TFT 10fA and the second TFT 10fB. Therefore, even if there are steps between the area of the array substrate 10b overlapping the first TFT 10fA and the second TFT 10fB and the area of the array substrate 10b not overlapping the first TFT 10fA and the second TFT 10fB, the space between the pair of substrates 10a and 10b kept by the spacers 11 hardly varies and becomes stabilized. Therefore, unevenness is less likely to occur in the image displayed on the display surface 10DS.

Figure 8:
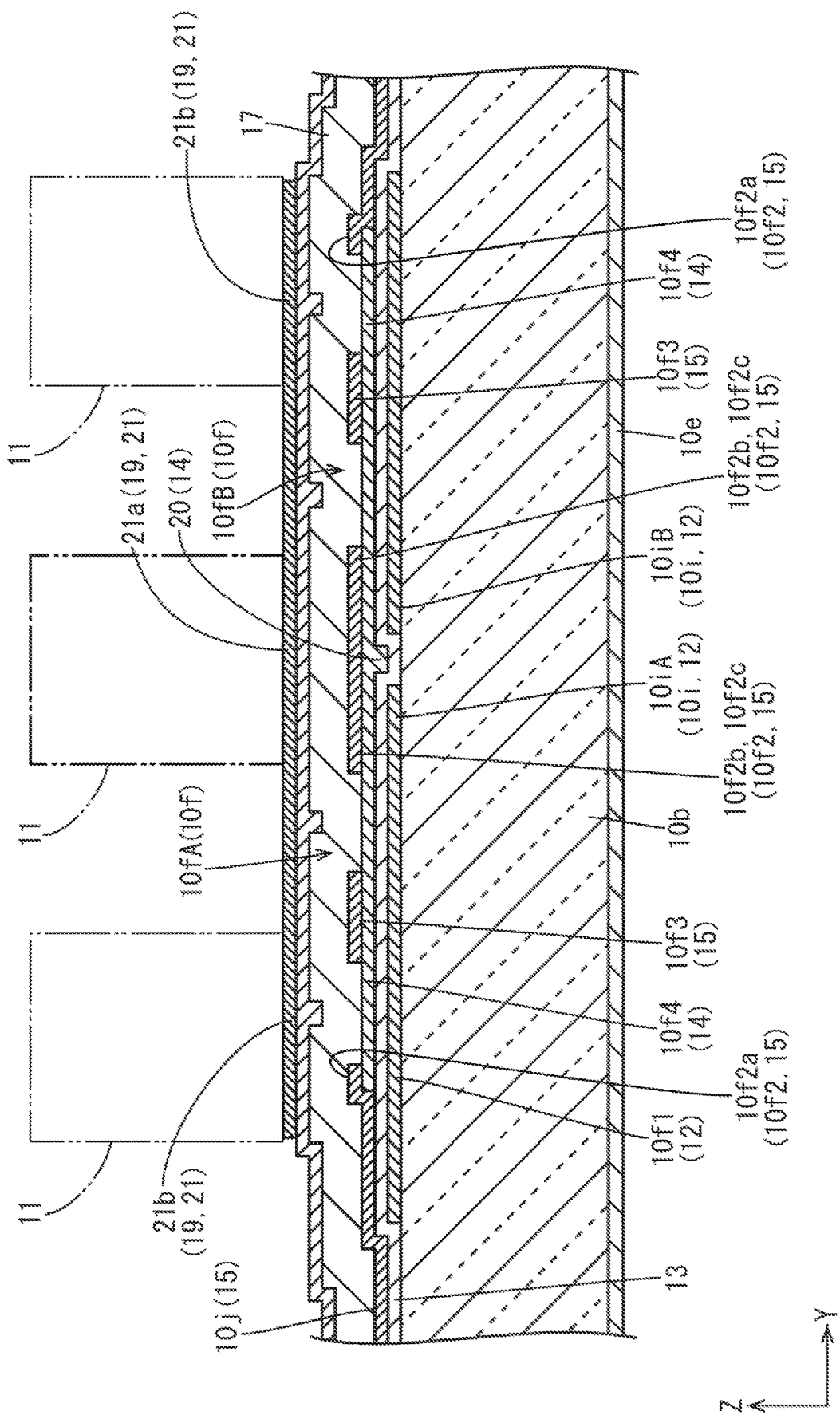
FIG. 8 is a cross-sectional view of FIG. 6 taken along line B-B.

As illustrated in FIGS. 6 and 8, among the spacers 11 dispersedly arranged in the plane of the display surface 10DS, the spacer 11 disposed closest to the curvature axis CAX as seen in the Y-axis direction (curvature direction) is in contact with the array substrate 10b at an intermediate position between the first TFT 10fA and the second TFT 10fB adjacent to each other in the Y-axis direction. The "intermediate position" can be defined as a position at which the distances from both centers of the first TFT 10fA and the second TFT 10fB are equal. In FIG. 6, the common electrode 10h is not illustrated. The curvature axis CAX is arranged to cross the center position of the curved liquid crystal panel 10 as seen in the long side direction in a plan view (see FIG. 1). Therefore, it can be said that the spacer 11 disposed closest to the curvature axis CAX as seen in the Y-axis direction is disposed at the center position of the curved liquid crystal panel 10 as seen in the long side direction. The spacer 11 disposed closest to the curvature axis CAX as seen in the Y-axis direction (the center position of the curved liquid crystal panel 10 as seen in the long side direction) is hardly changed in the position of contact with the array substrate 10b as seen in the Y-axis direction between before and after the curvature of the curved liquid crystal panel 10 in the manufacturing process. Even if there is any change, the amount of the change is minimal. In FIGS. 6 and 8, the spacer 11 disposed closest to the curvature axis CAX as seen in the Y-axis direction is illustrated by a thick two-dot chain line. On the other hand, the spacers 11 disposed farther from the curvature axis CAX in the Y-axis direction than the foregoing spacer 11 are changed in the position of contact with the array substrate 10b as seen in the Y-axis direction between before and after the curvature of the curved liquid crystal panel 10 in the manufacturing process. The amount of the change tends to be proportional to the distance from the curvature axis CAX. In FIGS. 6 and 8, the spacers 11 disposed at the positions farthest from the curvature axis CAX as seen in the Y-axis direction, that is, at both ends of the curved liquid crystal panel 10 as seen in the long side direction are illustrated by thin two-dot chain lines. Since the spacer 11 disposed closest to the curvature axis CAX as seen in the Y-axis direction is in contact with the intermediate position between the first TFT 10fA and the second TFT 10fB adjacent to each other on the array substrate 10b, even if the position of contact with the array substrate 10b changes according to the arrangement of the other spacers 11 with respect to the curvature axis CAX as seen in the Y-axis direction, the spacer 11 is highly likely to overlap at least one of the first TFT 10fA and the second TFT 10fB. As a result, the space between the pair of substrates 10a and 10b kept by the spacers 11 is less likely to vary. All the spacers 11 dispersedly arranged in the plane of the display surface 10DS are in contact with the array substrate 10b at the intermediate position between the first TFT 10fA and the second TFT 10fB adjacent to each other in the Y-axis direction before the curvature of the curved liquid crystal panel 10, that is, in a state where the display surface 10DS is flat in the manufacturing process.

As illustrated in FIGS. 6 and 8, each of the spacers 11 has a diameter (maximum outer dimension) larger than the space between the first gate line 10iA and the second gate line 10iB adjacent to each other in the Y-axis direction and the space between the first TFT 10fA and the second TFT 10fB adjacent to each other in the Y-axis direction. Specifically, the diameter of each of the spacers 11 is about 12 μm, for example, which is larger than the space between the first gate line 10iA and the second gate line 10iB adjacent to each other in the Y-axis direction and the space between the first TFT 10fA and the second TFT 10fB adjacent to each other in the Y-axis direction, about 3 μm, for example. There are steps between a portion between the first TFT 10fA and the second TFT 10fB and the first TFT 10fA and the second TFT 10fB as seen in the Y-axis direction due to the presence or absence of the first metal film 12. On the other hand, as described above, if the space between the first TFT 10fA and the second TFT 10fB adjacent to each other in the Y-axis direction is smaller than the diameter of the spacer 11, when the spacer 11 contacts the array substrate 10b in such a manner as to overlap the portion between the first TFT 10fA and the second TFT 10fB as seen in the Y-axis direction, portions of the spacer 11 are in contact with the array substrate 10b to overlap respectively the first TFT 10fA and the second TFT 10fB. Therefore, the spacers 11 appropriately perform the space keeping function, so that the space between the pair of substrates 10a and 10b becomes further unlikely to vary.

Configurations of the first TFT 10fA and the second TFT 10fB will be described in detail. As illustrated in FIG. 6, the first TFT 10fA has the gate electrode 10f1 formed by protruding a portion of the first gate line 10iA intersecting with the source line 10j toward the side opposite to the second gate line 10iB as seen in the Y-axis direction. The second TFT 10fB has the gate electrode 10f1 formed by protruding a portion of the second gate line 10iB intersecting with the source line 10j toward the side opposite to the first gate line 10iA as seen in the Y-axis direction. Therefore, the gate electrode 10f1 of the first TFT 10fA, the first gate line 10iA, the second gate line 10iB, and the gate electrode 10f1 of the second TFT 10fB are linearly aligned in sequence along the Y-axis direction. The arrangement range of these components is a range in which the flatness of the inner surface of the array substrate 10b is ensured, and a fluctuation allowable range of the positions of the spacers 11 in contact with the array substrate 10b. Therefore, it is possible to absorb variations in the positions of the spacers 11 in contact with the array substrate 10b due to the curvature of the curved display panel 10 over a wider range, thereby stabilizing the space between the pair of substrates 10a and 10b.

As illustrated in FIG. 6, each of the first TFT 10fA and the second TFT 10fB has a source electrode 10f2 that is formed from a portion of the source line 10j overlapping each of the gate electrodes 10f1. Therefore, image signals from the same (common) source line 10j are supplied to the first TFT 10fA and the second TFT 10fB. Each of the source electrodes 10f2 includes: a first source electrode constituent portion 10f2a that extends obliquely to the X-axis direction and the Y-axis direction at an obtuse angle with respect to a main part of the source line 10j (part not overlapping the gate electrode 10f1); a second source electrode constituent portion 10f2b that extends obliquely to the X-axis direction and the Y-axis direction at almost right angle with respect to the first source electrode constituent portion 10f2a; and a third source electrode constituent portion 10f2c that is parallel to the first source electrode constituent portion 10f2a at almost right angle with respect to the second source electrode constituent portion 10f2b and is opposed to the first source electrode constituent portion 10f2a. As a whole, the source electrode 10f2 has a channel shape opened to the pixel electrode 10g side in a plan view. Each of the first TFT 10fA and the second TFT 10fB has a drain electrode 10f3 disposed at a position with a space left from the source electrode 10f2.

As illustrated in FIG. 6, the drain electrode 10f3 extends in parallel to the first source electrode constituent portion 10f2a and the third source electrode constituent portion 10f2c constituting the source electrode 10f2. The drain electrode 10f3 is positioned at almost equal distance from the source electrode constituent portions 10f2a to 10f2c. The drain electrode 10f3 has an end portion led out from the opening in the source electrode 10f2 and connected to the pixel electrode 10g. In the TFT 10f, the space between the source electrode 10f2 and the drain electrode 10f3 connected together via the channel part 10f4 is set to be smaller than the diameter of the spacer 11. Specifically, the space between the source electrode 10f2 and the drain electrode 10f3 connected via the channel part 10f4 in the TFT 10f is about 4 μm, for example, which is smaller than the diameter of the spacer 11, about 12 μm, for example. There are generated steps between the portion between the source electrode 10f2 and the drain electrode 10f3 connected together via the channel part 10f4 and the source electrode 10f2 and the drain electrode 10f3 due to the presence or absence of the second metal film 15. On the other hand, as described above, if the space between the source electrode 10f2 and the drain electrode 10f3 is smaller than the diameter of the spacer 11, when the spacer 11 contacts the array substrate 10b in such a manner as to overlap the portion between the source electrode 10f2 and the drain electrode 10f3, portions of the spacer 11 are in contact with the array substrate 10b to overlap respectively the source electrode 10f2 and the drain electrode 10f3. Therefore, the spacers 11 appropriately perform the space keeping function, so that the space between the pair of substrates 10a and 10b becomes further unlikely to vary.

Each of the first TFT 10fA and the second TFT 10fB has the channel part 10f4 that is made of the semiconductor film 14 and is connected to the source electrode 10f2 and the drain electrode 10f3 as illustrated in FIG. 6. Each of the channel part 10f4 overlaps the gate electrode 10f1 with the gate insulating film 13 therebetween and is sized to fall within the formation range of the source electrode 10f2 in a plan view. That is, each of the channel parts 10f4 selectively has a portion that is positioned between the source electrode 10f2 and the drain electrode 10f3 as connection targets in a plan view and portions that overlaps a portion of the source electrode 10f2 and a portion of the drain electrode 10f3. The semiconductor material to be the channel part 10f4 has no portion protruding outward from the outer shape of the source electrode 10f2. Therefore, when the curved display panel 10 is irradiated with external light (including the irradiation light of the backlight device), the external light (including reflection light of the external light reflected between the first metal film 12 and the second metal film 15 or the like) is hardly applied to the semiconductor material to be the channel part 10f4 on the source electrode 10f2 side. If the semiconductor material to be the channel part has a portion protruding from the source electrode 10f2, when the amount of external light applied to the curved display panel 10 fluctuates, the electrostatic capacitance value between the source electrode 10f2 and the gate electrode 10f1 fluctuates to vary the video signal, which may result in display defects. In that respect, as described above, making the external light hard to apply to the semiconductor material to be the channel part 10f4 on the source electrode 10f2 makes it less prone to occur display defects even with fluctuations in the amount of irradiation light to the curved display panel 10. The channel part 10f4 has a substantially rhombic planar shape, and each of the sides thereof is parallel to the outer shape of the source electrode 10f2. The channel part 10f4 of the first TFT 10fA and the channel part 10f4 of the second TFT 10fB are coupled together by a channel connecting portion 20 formed from the semiconductor film 14. The channel connecting portion 20 extends along the Y-axis direction in such a manner as to bridge between the first TFT 10fA and the second TFT 10fB adjacent to each other with a space therebetween as seen in the Y-axis direction. Therefore, the channel connecting portion 20 reduces the steps existing between the portion between the first TFT 10fA and the second TFT 10fB and the first TFT 10fA and the second TFT 10fB. This improves the flatness of the portion of the array substrate 10b in contact with the spacers 11 (the portion overlapping the spacers 11), so that the space between the pair of substrates 10a and 10b becomes more stable. Although the channel parts 10f4 of the first TFT 10fA and the second TFT 10fB are coupled together by the channel connecting portion 20, the first TFT 10fA and the second TFT 10fB are driven by different scanning signals, so that it is possible to avoid a short-circuit between the TFTs.

In addition, as illustrated in FIGS. 6 and 8, the array substrate 10b is provided with the light shielding part 21 formed from the third metal film 19. The light shielding part 21 is formed by connecting together an inter-line light shielding part 21a disposed to straddle both the first gate line 10iA and the second gate line 10iB adjacent to each other in the Y-axis direction and an array-side inter-electrode light shielding part (one-side inter-electrode light shielding part) 21b disposed to straddle both the source electrode 10f2 and the drain electrode 10f3 connected together via the channel part 10f4 in the TFT 10f. The third metal film 19 constituting the light shielding part 21 has light-shielding and electrically-conductive properties and is directly laminated to the second transparent electrode film 18. That is, the light shielding part 21 is conductively connected to the common electrode 10h. According to this configuration, it is possible to lower the resistance of the common electrode 10h to which the light shielding part 21 is conductively connected, so that the common electrode 10h can be stably kept at the reference potential. This suppresses occurrence of display defects such as shadowing. In FIG. 6, the formation range of the light shielding part 21 is indicated in shaded form.

As illustrated in FIG. 6, the inter-line light shielding part 21*a* constituting the light shielding part 21 extends along the X-axis direction in parallel to the first gate line 10*i*A and the second gate line 10*i*B, and covers the portion between the first gate line 10*i*A and the second gate line 10*i*B over the entire length. The inter-line light shielding part 21*a* is provided not only in the portion between the first gate line 10*i*A and the second gate line 10*i*B but also in an area overlapping both the first gate line 10*i*A and the second gate line 10*i*B. According to this configuration, even if light is about to leak from the portion between the first gate line 10*i*A and the second gate line 10*i*B, the light can be absorbed or reflected by the inter-line light shielding part 21*a*. Accordingly, light leakage from between the first gate line 10*i*A and the second gate line 10*i*B is less prone to occur.

As illustrated in FIG. 6, the array-side inter-electrode light shielding part 21*b* constituting the light shielding part 21 is provided to protrude from the inter-line light shielding part 21*a* toward each of the TFTs 10*f*A and 10*f*B along the Y-axis direction. The array-side inter-electrode light shielding part 21*b* is arranged to overlap the gate electrodes 10*f*1 protruding from the gate line 10*i* along the Y-axis direction in a plan view. As a result, the array-side inter-electrode light shielding part 21*b* is disposed to overlap not only the entire area of the portion between the source electrode 10*f*2 and the drain electrode 10*f*3 but also substantially the entire areas of the source electrode 10*f*2 and the drain electrode 10*f*3 in each of the TFTs 10*f*A and 10*f*B in a plan view. According to this configuration, it is possible to suppress external light from being applied to the channel part 10*f*4 made of a semiconductor material and positioned in the portion between the source electrode 10*f*2 and the drain electrode 10*f*3. This makes it possible to reduce characteristic fluctuations of the TFTs 10*f*A and 10*f*B, particularly leakage current that can occur in the TFTs 10*f*A and 10*f*B in the off state.

On the other hand, as illustrated in FIGS. 5 and 6, the CF substrate 10*a* includes CF-side inter-electrode light shielding parts (other-side inter-electrode light shielding parts) 22 to overlap a range straddling both the source electrode 10*f*2 and the drain electrode 10*f*3 connected together via the channel part 10*f*4 in the TFT 10*f* on the array substrate 10*b*. The CF-side inter-electrode light shielding parts 22 are integrated with the inter-pixel light shielding parts 10*l* by partially widening the inter-pixel light shielding parts 10*l* provided as existing structures on the CF substrate 10*a*. Specifically, the CF-side inter-electrode light shielding parts 22 are formed by widening the portions of the inter-pixel light shielding parts 10*l* overlapping the first TFT 10*f*A and the second TFT 10*f*B. Accordingly, the CF-side inter-electrode light shielding parts 22 are disposed to overlap not only the entire area of the portion between the source electrode 10*f*2 and the drain electrode 10*f*3 in each of the TFTs 10*f*A and 10*f*B but also portions of the drain electrode 10*f*3 and the source electrode 10*f*2 in a plan view. According to this configuration, it is possible to suppress external light from being applied to the channel part 10*f*4 made of a semiconductor material and positioned in the portion between the source electrode 10*f*2 and the drain electrode 10*f*3. This makes it possible to reduce characteristic fluctuations of the TFTs 10*f*A and 10*f*B, particularly leakage current that can occur in the TFTs 10*f*A and 10*f*B in the off state.

As described above, the color filters 10*k* are disposed on the CF substrate 10*a* to extend along the Y-axis direction (curvature direction) and straddle the first pixel electrodes 10*g*A and the second pixel electrodes 10*g*B adjacent to each other in the Y-axis direction as illustrated in FIGS. 3 and 5. Accordingly, even when the arrangement of the color filters 10*k* may vary with respect to the first pixel electrodes 10*g*A and the second pixel electrodes 10*g*B on the array substrate 10*b* in the Y-axis direction due to the curvature of the curved liquid crystal panel 10, the color filters 10*k* of different colors are aligned along the X-axis direction, extend along the Y-axis direction, and are disposed to straddle the first pixel electrodes 10*g*A and the second pixel electrodes 10*g*B, which makes color mixture due to the curvature of the display surface 10DS less prone to occur.

As described above, the curved liquid crystal panel (curved display panel) 10 of the present embodiment is the curved liquid crystal panel 10 in which the display surface 10DS to display an image is curved around at least the one curvature axis (curvature axis) CAX and that includes: the pair of substrates 10*a* and 10*b* disposed such that plate surfaces are opposed to each other with a space therebetween; the first TFT (first switching element) 10*f*A provided on the array substrate (first substrate) 10*b* of the pair of substrates 10*a* and 10*b*; the second TFT (second switching element) 10*f*B that is provided on the array substrate 10*b* and is adjacent to the first TFT 10*f*A in the curvature direction orthogonal to the curvature axis CAX and along the display surface 10DS; and the spacers 11 that are provided on the CF substrate (second substrate) 10*a* of the pair of substrates 10*a* and 10*b* to keep the space between the pair of substrates 10*a* and 10*b* and is disposed to overlap at least one of the first TFT 10*f*A and the second TFT 10*f*B adjacent to each other.

Accordingly, an image is displayed on the curved display surface 10DS based on driving of the first TFT 10*f*A and the second TFT 10*f*B. The space between the pair of substrates 10*a* and 10*b* can be kept by the spacers 11 provided on the CF substrate 10*a* out of the pair of substrates 10*a* and 10*b* which are opposed to each other with the space between the plate surfaces. The position of the spacers 11 to the array substrate 10*b* can be varied in the curvature direction due to the curvature of the curved liquid crystal panel 10 around the curvature axis CAX. This may cause variations in the space between the pair of substrates 10*a* and 10*b* kept by the spacers 11.

In that respect, the array substrate 10*b* has the second TFT 10*f*B adjacent to the first TFT 10*f*A in the curvature direction, and the spacers 11 are disposed to overlap at least one of the first TFT 10*f*A and the second TFT 10*f*B. Accordingly, even if the positions of the spacers 11 to the array substrate 10*b* varies in the curvature direction due to the curvature of the curved liquid crystal panel 10 around the curvature axis CAX, the spacers 11 are hardly arranged not to overlap the first TFT 10*f*A or the second TFT 10*f*B. That is, the spacers 11 are highly likely to overlap either the first TFT 10*f*A or the second TFT 10*f*B. Therefore, even if there are steps between the area of the array substrate 10*b* overlapping the first TFT 10*f*A and the second TFT 10*f*B and the area of the array substrate 10*b* not overlapping the first TFT 10*f*A and the second TFT 10*f*B, the space between the pair of substrates 10*a* and 10*b* kept by the spacers 11 hardly varies and becomes stabilized. Accordingly, unevenness is less prone to occur in the image displayed on the display surface 10DS.

In addition, the spacers 11 are dispersedly disposed in the plane of the display surface 10DS, and among the spacers 11, the spacer 11 disposed closest to the curvature axis CAX as seen in the curvature direction is located at the intermediate position between the first TFT 10*f*A and the second TFT 10*f*B adjacent to each other in the array substrate 10*b*. Accordingly, the space between the pair of substrates 10*a* and 10*b* is favorably kept by the spacers 11 that are dispersedly disposed in the plane of the display surface 10DS. Among the spacers 11, the spacer 11 disposed closest to the curvature axis CAX as seen in the curvature direction hardly changes in position in the curvature direction to the array substrate 10b before and after the curved liquid crystal panel 10 is curved. Even if such a change occurs, the amount of the change is minimal. Since the spacer 11 disposed closest to the curvature axis CAX as seen in the curvature direction is located at the intermediate position between the first TFT 10fA and the second TFT 10fB adjacent to each other on the array substrate 10b, even if the position of the spacer 11 to the array substrate 10b changes according to the arrangement of the other spacers 11 with respect to the curvature axis CAX as seen in the curvature direction, the spacer 11 is highly likely to overlap at least one of the first TFT 10fA and the second TFT 10fB. As a result, the space between the pair of substrates 10a and 10b kept by the spacers 11 is less likely to vary.

In addition, the first TFT 10fA and the second TFT 10fB adjacent to each other are disposed with a space therebetween, and the space is smaller than the dimension of the spacer 11 as seen in the curvature direction. The portion between the first TFT 10fA and the second TFT 10fB adjacent to each other forms steps with respect to the first TFT 10fA and the second TFT 10fB. Even when the spacer 11 is arranged to overlap the portion between the first TFT 10fA and the second TFT 10fB, a portion of the spacer 11 overlaps at least one of the first TFT 10fA and the second TFT 10fB. Therefore, the spacers 11 appropriately perform the space keeping function, so that the space between the pair of substrates 10a and 10b becomes further unlikely to vary.

Each of the first TFT 10fA and the second TFT 10fB has at least: the source electrode 10f2 to which an image signal is supplied; the channel part 10f4 that is made of a semiconductor material and is connected to the source electrode 10f2; and the drain electrode 10f3 that is disposed with a space from the source electrode 10f2 and is connected to the channel part 10f4. The space between the source electrode 10f2 and the drain electrode 10f3 connected together via the channel part 10f4 is smaller than the dimension of the spacer 11 as seen in the curvature direction. Accordingly, the image signal supplied to the source electrode 10f2 is supplied to the drain electrode 10f3 through the channel part 10f4 made of a semiconductor material. The portion between the source electrode 10f2 and the drain electrode 10f3 connected together via the channel part 10f4 forms steps with respect to the source electrode 10f2 and the drain electrode 10f3. Even if the spacer 11 overlaps the portion between the source electrode 10f2 and the drain electrode 10f3, a portion of the spacer 11 overlaps at least one of the source electrode 10f2 and the drain electrode 10f3. Therefore, the spacers 11 appropriately perform the space keeping function, so that the space between the pair of substrates 10a and 10b becomes further unlikely to vary.

Further, the array substrate 10b includes: the first gate line (first line part) 10iA that extends along the direction intersecting with the curvature direction and is connected to the first TFT 10fA; the second gate line (second line part) 10iB that extends in parallel to the first gate line 10iA, is disposed adjacent to the first gate line 10iA with a space therebetween as seen in the curvature direction, and is connected to the second TFT 10fB; and the inter-line light shielding part 21a that extends in parallel to the first gate line 10iA and the second gate line 10iB and is disposed to straddle both the first gate line 10iA and the second gate line 10iB. Accordingly, signals are supplied to the first TFT 10fA and the second TFT 10fB via the first gate line 10iA and the second gate line 10iB. The portion between the first gate line 10iA and the second gate line 10iB as seen in the curvature direction extends in parallel to the first gate line 10iA and the second gate line 10iB, and thus there is a risk of light leakage from the portion. However, as described above, the inter-line light shielding part 21a extends in parallel to the first gate line 10iA and the second gate line 10iB and straddles both the first gate line 10iA and the second gate line 10iB, and thus light is less prone to leak from the portion between the first gate line 10iA and the second gate line 10iB. In addition, the aperture ratio can be kept high as compared to the case where the inter-line light shielding part 21a similar to the above is provided on the CF substrate 10a. The light leakage described above is noticeable in the normally white mode when the curved liquid crystal panel 10 is used in a liquid crystal display device, but may also occur in the normally black mode because the orientation of the liquid crystal molecules gets disturbed by electric fields from the first gate line 10iA and the second gate line 10iB. In the FFS mode or the like, the common electrode 10h is arranged above the first gate line 10iA and the second gate line 10iB, but the electric field may leak from the openings such as the slits 10hl in the common electrode 10h. In addition, when orientation treatment (rubbing or the like) for initial orientation of the liquid crystal molecules is insufficiently applied to the alignment films 10n and 10o due to the arrangement of the spacers 11, light leakage may occur at these parts by orientation disturbance.

The array substrate 10b includes: the first pixel electrode 10gA that is disposed adjacent to the first gate line 10iA on the side opposite to the second gate line 10iB as seen the curvature direction and is connected to the first TFT 10fA; the second pixel electrode 10gB that is disposed adjacent to the second gate line 10iB on the side opposite to the first gate line 10iA as seen in the curvature direction and is connected to the second TFT 10fB; and the common electrode 10h that is disposed to overlap the first pixel electrode 10gA and the second pixel electrode 10gB with the inter-layer insulating film (insulating film) 17 therebetween and to which the reference potential is supplied. The inter-line light shielding part 21a is made of a light-shielding and electrically-conductive material and is disposed in contact with the common electrode 10h. Accordingly, the first pixel electrode 10gA and the second pixel electrode 10gB are charged based on driving of the first TFT 10fA and the second TFT 10fB. A potential difference is generated between the common electrode 10h to which the reference potential is supplied and the first pixel electrode 10gA and the second pixel electrode 10gB based on voltage values of the charged first pixel electrode 10gA and second pixel electrode 10gB. Based on the potential difference, a predetermined gradation is displayed on the display surface 10DS. The inter-line light shielding part 21a extending in parallel to the first gate line 10iA and the second gate line 10iB is made of a light-shielding and electrically-conductive material and is disposed in contact with the common electrode 10h, which achieves a lower resistance of the common electrode 10h. Thus, the common electrode 10h can be stably kept at the reference potential, thereby suppressing the occurrence of display defects such as shadowing.

Each of the first TFT 10fA and the second TFT 10fB has at least: the source electrode 10f2 to which an image signal is supplied; the channel part 10f4 that is made of a semiconductor material and is connected to the source electrode 10f2; and the drain electrode 10f3 that is disposed with a space from the source electrode 10f2 and is connected to the channel part 10f4. The array substrate 10b includes the array-side inter-electrode light shielding part (one-side inter-electrode light shielding part) 21b that is disposed to straddle both the source electrode 10f2 and the drain electrode 10f3. Accordingly, the image signal supplied to the source electrode 10f2 is supplied to the drain electrode 10f3 through the channel part 10f4 made of a semiconductor material. The array-side inter-electrode light shielding part 21b is disposed on the array substrate 10b to straddle both the source electrode 10f2 and the drain electrode 10f3, which suppresses irradiation of the channel part 10f4 made of a semiconductor material and located between the source electrode 10f2 and the drain electrode 10f3 with external light. This makes it possible to reduce characteristic fluctuations of the TFTs 10fA and 10fB, particularly leakage current that can occur in the TFTs 10fA and 10fB in the off state.

Each of the first TFT 10fA and the second TFT 10fB has at least: the source electrode 10f2 to which an image signal is supplied; the channel part 10f4 that is made of a semiconductor material and is connected to the source electrode 10f2; and the drain electrode 10f3 that is disposed with a space from the source electrode 10f2 and is connected to the channel part 10f4. The CF substrate 10a includes the CF-side inter-electrode light shielding part (other-side inter-electrode light shielding part) 22 in such a manner as to overlap a range straddling both the source electrode 10f2 and the drain electrode 10f3. Accordingly, the image signal supplied to the source electrode 10f2 is supplied to the drain electrode 10f3 through the channel part 10f4 made of a semiconductor material. The CF-side inter-electrode light shielding part 22 is disposed on the array substrate 10a to overlap a range straddling both the source electrode 10f2 and the drain electrode 10f3, which suppresses irradiation of the channel part 10f4 made of a semiconductor material and positioned at the intermediate portion between the source electrode 10f2 and the drain electrode 10f3 with external light. This makes it possible to reduce characteristic fluctuations of the TFTs 10fA and 10fB, particularly leakage current that can occur in the TFTs 10fA and 10fB in the off state.

The array substrate 10b includes pixel electrodes 10g aligned along the direction intersecting with the curvature direction, whereas the CF substrate 10a includes the inter-pixel light shielding part 10l that extends along the curvature direction and is disposed between the adjacent pixel electrodes 10g. The CF-side inter-electrode light shielding part 22 is formed by partially widening the inter-pixel light shielding part 10l. Accordingly, by disposing the inter-pixel light shielding part 10l between the pixel electrodes 10g aligned along the direction intersecting with the curvature direction, light hardly leaks from the portion between the adjacent pixel electrodes 10g. The CF-side inter-electrode light shielding part 22 is formed by partially widening the inter-pixel light shielding part 10l, which makes it possible to reduce the cost for installing the CF-side inter-electrode light shielding part 22.

The array substrate 10b includes the first pixel electrodes 10gA and the second pixel electrodes 10gB that are respectively connected to the first TFT 10fA and the second TFT 10fB and are aligned along the curvature direction. These first pixel electrodes 10gA and the second pixel electrodes 10gB are aligned along the direction intersecting with the curvature direction. The CF substrate 10a includes the color filters 10k of different colors that are aligned along the direction intersecting with the curvature direction to overlap the first pixel electrodes 10gA and the second pixel electrodes 10gB. The color filters 10k extend along the curvature direction and are disposed to straddle the first pixel electrodes 10gA and the second pixel electrodes 10gB. Accordingly, when the first pixel electrodes 10gA and the second pixel electrodes 10gB are charged by driving the first TFT 10fA and the second TFT 10fB, the amount of transmitted light of each of the color filters 10k is controlled based on the voltage value, so that color display with a predetermined gradation is produced on the display surface 10DS. Even if the arrangement of the color filters 10k on the array substrate 10b with respect to the first pixel electrodes 10gA and the second pixel electrodes 10gB varies in the curvature direction due to the curvature of the curved liquid crystal panel 10, the color filters 10k of different colors are aligned along the direction intersecting with the curvature direction, extend along the curvature direction, and are disposed to straddle the first pixel electrodes 10gA and the second pixel electrodes 10gB, which makes color mixture less prone to occur.

The array substrate 10b includes: the first gate line 10iA that extends along the direction intersecting with the curvature direction and is connected to the first TFT 10fA; and the second gate line 10iB that extends in parallel to the first gate line 10iA, is disposed adjacent to the first gate line 10iA with a space therebetween in the curvature direction, and is connected to the second TFT 10fB. Scanning signals are supplied to the first gate line 10iA and the second gate line 10iB. The first TFT 10fA and the second TFT 10fB have at least the gate electrodes 10f1 respectively connected to the first gate line 10iA and the second gate line 10iB. The gate electrode 10f1 of the first TFT 10fA is disposed adjacent to the first gate line 10iA on the side opposite to the second gate line 10iB as seen in the curvature direction. The gate electrode 10f1 of the second TFT 10fB is disposed adjacent to the second gate line 10iB on the side opposite to the first gate line 10iA as seen in the curvature direction. Accordingly, when scanning signals are supplied to the first gate line 10iA and the second gate line 10iB, the first TFT 10fA and the second TFT 10fB are driven based on the scanning signals. The gate electrodes 10f1 of the first TFT 10fA and the second TFT 10fB, the first gate line 10iA, and the second gate line 10iB are aligned along the curvature direction, and the arrangement range of these components constitutes the fluctuation allowable range of the positions of the spacers 11 with respect to the array substrate 10b. Therefore, it is possible to absorb variations in the positions of the spacers 11 with respect to the array substrate 10b due to the curvature of the curved liquid crystal panel 10 over a wider range, thereby further stabilizing the space between the pair of substrates 10a and 10b.

The first TFT 10fA and the second TFT 10fB are disposed with a space therebetween, and each of them has at least the channel part 10f4 that is made of a semiconductor material and overlaps the gate electrode 10f1 via the gate insulating film (insulating film) 13. The channel part 10f4 of the first TFT 10fA and the channel part 10f4 of the second TFT 10fB are coupled with each other. Accordingly, when the first TFT 10fA and the second TFT 10fB are driven based on scanning signals supplied to the first gate line 10iA and the second gate line 10iB, the channel parts 10f4 of the TFTs are energized. A portion between the first TFT 10fA and the second TFT 10fB adjacent to each other forms steps with respect to the first TFT 10fA and the second TFT 10fB. However, the channel part 10f4 of the first TFT 10fA and the channel part 10f4 of the second TFT 10fB are provided to be coupled with each other, and thus the steps are reduced by the coupled portion. This improves the flatness of the portions of the array substrate 10b overlapping the spacers 11, so that the space between the pair of substrates 10a and 10b is more stabilized. Although the channel part 10f4 of the first TFT 10fA and the channel part 10f4 of the second TFT 10fB are coupled together, the first TFT 10fA and the second TFT 10fB are driven by different scanning signals, so that it is possible to avoid a short-circuit between the first TFT 10fA and the second TFT 10fB.

Each of the first TFT 10fA and the second TFT 10fB has at least: the channel part 10f4 that is made of a semiconductor material and overlaps the gate electrode 10f1 via the insulating film 13; the source electrode 10f2 that is connected to the channel part 10f4; and the drain electrode 10f3 that is disposed with a space from the source electrode 10f2 and is connected to the channel part 10f4. The channel part 10f4 selectively has a portion positioned between the source electrode 10f2 and the drain electrode 10f3 as connection targets and a portion overlapping at least a portion of the source electrode 10f2 and a portion of the drain electrode 10f3. Accordingly, the image signal supplied to the source electrode 10f2 is supplied to the drain electrode 10f3 through the channel part 10f4 made of a semiconductor material. The semiconductor material to be the channel part 10f4 does not have a portion protruding outward from the outer shape of the source electrode 10f2. Therefore, when the curved liquid crystal panel 10 is irradiated with external light, the external light is hardly applied to the semiconductor material to be the channel part 10f4 on the source electrode 10f2 side. If the semiconductor material to be the channel part has a portion protruding from the source electrode 10f2, when the amount of external light applied to the curved liquid crystal panel 10 fluctuates, the electrostatic capacitance value between the source electrode 10f2 and the gate electrode 10f1 fluctuates to vary the video signal, which may result in display defects. In that respect, as described above, making the external light hard to apply to the semiconductor material to be the channel part 10f4 on the source electrode 10f2 makes it less prone to occur display defects even with fluctuations in the amount of irradiation light to the curved liquid crystal panel 10.

Second Embodiment

A second embodiment of the present invention will be described with reference to FIGS. 9 to 13. In the second embodiment, the manner of curving of a curved liquid crystal panel 110 is changed from that in the first embodiment. Duplicated descriptions of the same structures, operations, and advantageous effects as those of the first embodiment will be omitted.

Figure 9:
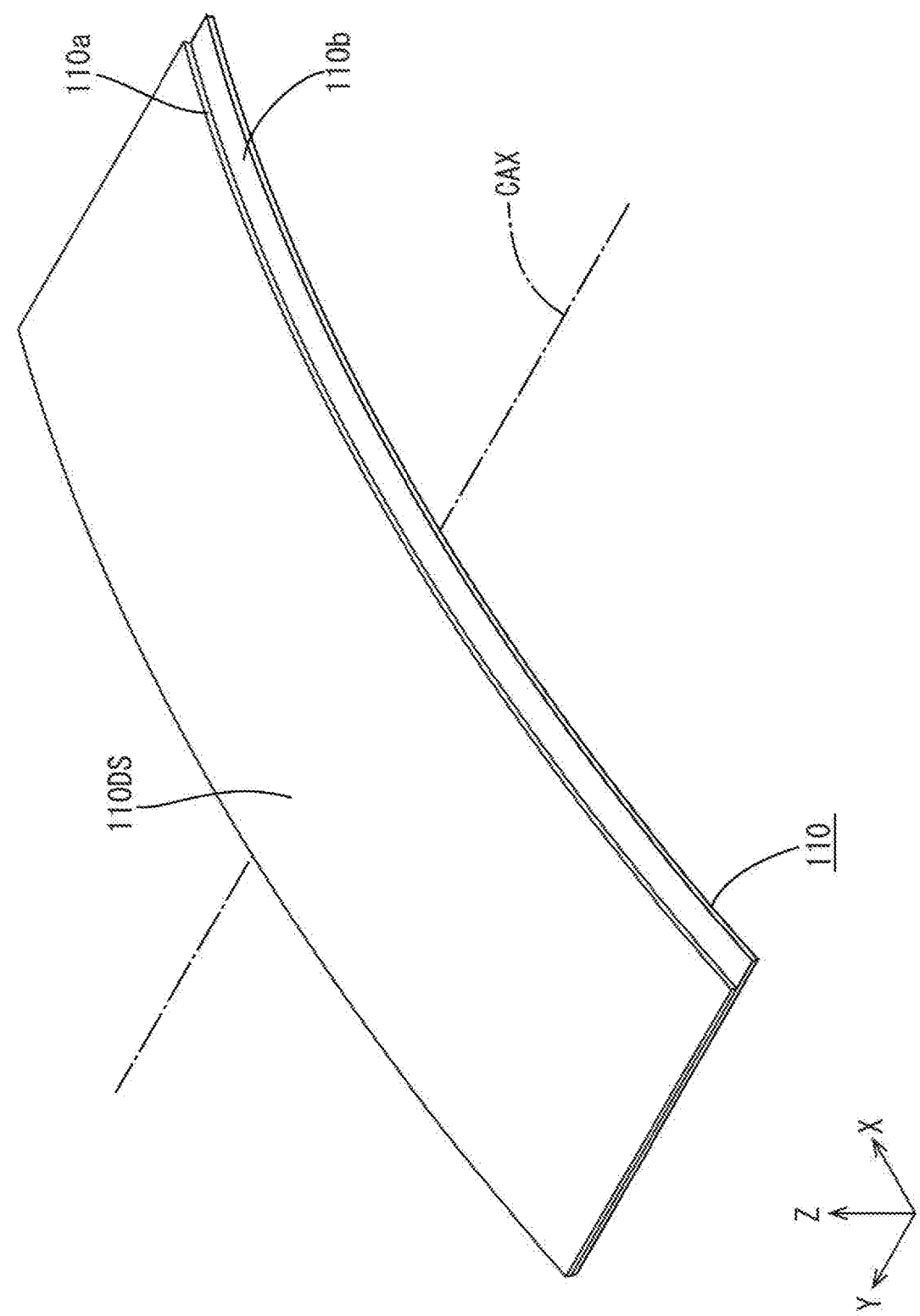
FIG. 9 is a schematic perspective view of a curved liquid crystal panel according to a second embodiment of the present invention.

As illustrated in FIG. 9, the curved liquid crystal panel 110 according to the present embodiment has a horizontally elongated square shape as a whole. In the curved liquid crystal panel 110, a short side direction coincides with the Y-axis direction illustrated in the drawings, a long side direction coincides with the X-axis direction illustrated in the drawings, and a plate thickness direction coincides with the Z axis direction illustrated in the drawings. In the curved liquid crystal panel 110, a curvature axis CAX has an axis direction coincident with the short side direction (Y-axis direction) of the curved liquid crystal panel 110, and a curvature direction orthogonal to the curvature axis CAX and aligned with a display surface 110DS (direction in which the curvature of the display surface 110DS changes) coincides with the long side direction (X-axis direction) of the curved liquid crystal panel 110. A CF substrate 110a constituting the curved liquid crystal panel 110 has a short side dimension shorter than a short side dimension of an array substrate 110b. The CF substrate 110a is bonded to the array substrate 110b such that one end of the CF substrate 110a aligns with one end of the array substrate 110b as seen in the short side direction. Therefore, the other end of the array substrate 110b as seen in the short side direction protrudes beyond the CF substrate 110a. The protruding portion is connected to a flexible substrate (not illustrated) relayed to a signal supply source.

Figure 10:
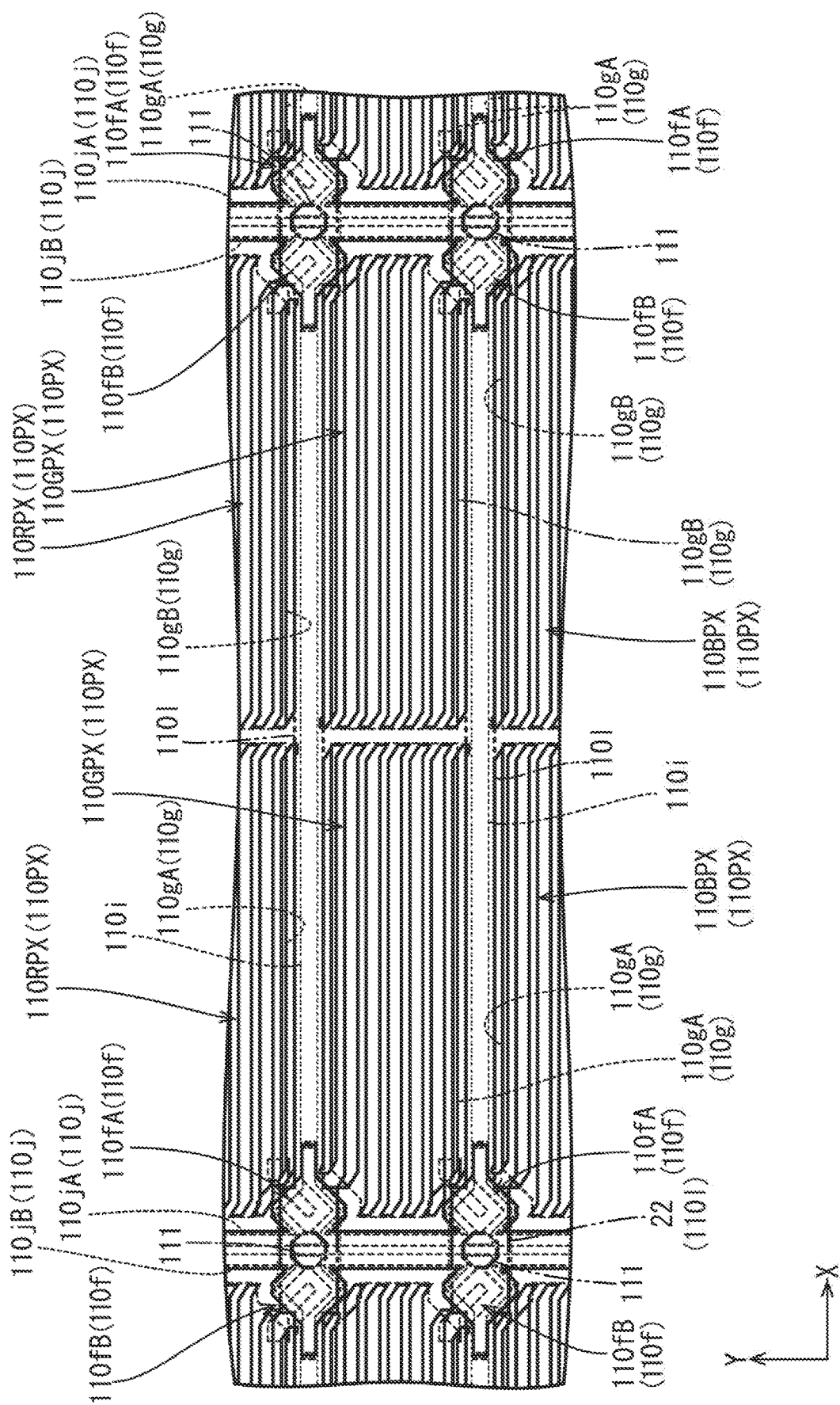
FIG. 10 is a plan view illustrating a line configuration in a display area of an array substrate.
Figure 12:
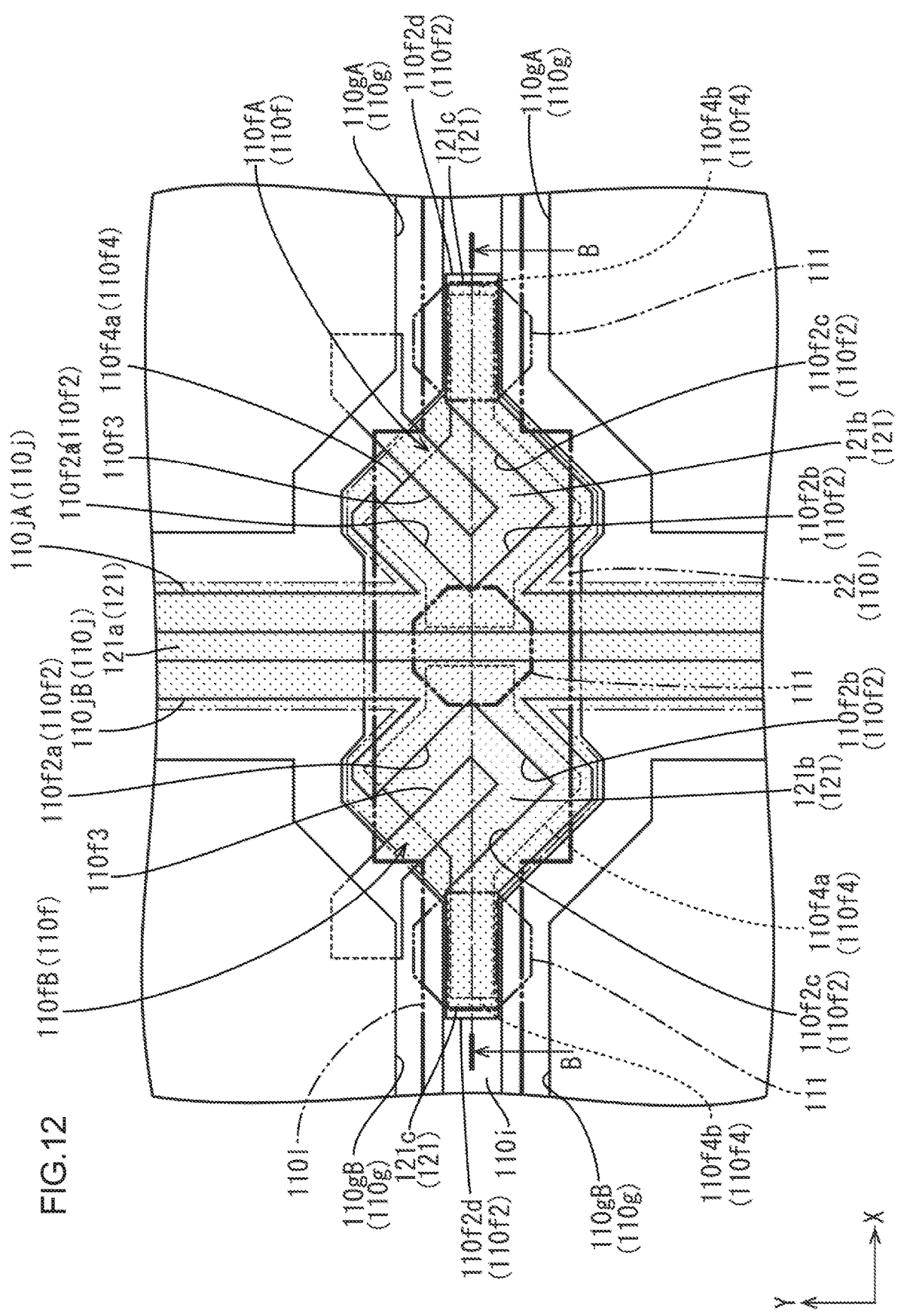
FIG. 12 is an enlarged plan view of TFTs and their vicinities in the display area of the array substrate.

In the present embodiment, as illustrated in FIG. 10, each of pixel electrodes 110g provided on the array substrate 110b has a horizontally elongated shape. Its long side direction coincides with the X-axis direction (curvature direction), and its short side direction coincides with the Y-axis direction (axial direction of the curvature axis CAX). As illustrated in FIG. 12, two source lines 110j extending in the Y-axis direction as the short side direction of the pixel electrode 110g are aligned adjacent to each other with a predetermined space as seen in the X-axis direction. Hereinafter, among the two source lines 110j adjacent to each other in the Y-axis direction, the right source line 110j illustrated in FIG. 10 will be referred to as "first source line (first line part)" and the suffix A will be added to the reference symbol, and the source line 110j adjacent to the first source line 10jA on the left side in FIG. 10 will be referred to as "second source line (second line part)" and the suffix B will be added to the reference symbol. No suffixes will be added to the reference symbols when the source lines 110j are not differentiated but are collectively called. The space between the first source line 10jA and the second source line 110jB is narrower than the line width of the source lines 110j, for example, about 3 μm. However, the present invention is not necessarily limited thereto. As described above, the source lines 110j extend along the short side direction of the pixel electrode 110g and are aligned with a space therebetween as seen in the long side direction of the pixel electrode 110g, so that the space between the source lines 110j as seen in the X-axis direction has a ratio obtained by dividing the short side dimension of the pixel electrode 110g by the long side dimension of the pixel electrode 110g (for example, about ⅓) to that in the first embodiment. Accordingly, the number of the source lines 110j per unit length as seen in the X-axis direction has the same ratio as described above (for example, about ⅓). This decreases the number of the source lines 110j. Therefore, the number of image signals supplied to the source lines 110j can be decreased to reduce the manufacturing cost of the curved liquid crystal panel 110.

As illustrated in FIGS. 10 and 12, similarly to the source lines 110j, two TFTs 110f to which the source lines 110j are connected are aligned adjacent to each other at a predetermined space as seen in the X-axis direction. Hereinafter, among the two TFTs 110f adjacent to each other in the X-axis direction, the right TFT 110f illustrated in FIG. 10 will be referred to as "first TFT (first switching element)" and the suffix A will be added to the reference symbol, and the TFT 110f adjacent to the first TFT 100fA on the left side in FIG. 10 will be referred to as "second TFT (second switching element)" and the suffix B will be added to the reference symbol. No suffixes will be added to the reference symbols when the TFTs 110f are not differentiated but are collectively called. The space between the first TFT 110fA and the second TFT 110fB is substantially equal to the space between the two source lines 110jA and 110jB described above. The first TFT 110fA is connected to the first source line 110jA and image signals supplied to the first source line 110jA are supplied to the source electrode 110f2. The second TFT 10fB is connected to the second source line 110jB and image signals supplied to the second source line 110*j*B are supplied to the source electrode 110*f*2. Therefore, different image signals are supplied to the first TFT 110*f*A and the second TFT 110*f*B. On the other hand, the same (common) gate line (third line part) 110*i* is connected to the first TFT 110*f*A and the second TFT 110*f*B, so that the first TFT 110*f*A and the second TFT 110*f*B are driven at the same timing based on the same scanning signal.

As illustrated in FIG. 10, the two pixel electrodes 110*g* are arranged back to back as seen in the X-axis direction with the adjacent first source line 110*j*A and second source line 110*j*B sandwiched therebetween. Hereinafter, the pixel electrode 110*g* adjacent to the first source line 110*j*A as seen in the X-axis direction on the side opposite to the second source line 110*j*B (the right side in FIG. 10) will be referred to as "first pixel electrode" and the suffix A will be added to the reference symbol, and the pixel electrode 110*g* adjacent to the second source line 110*j*B as seen in the X-axis direction on the side opposite to the first source line 110*j*A (the left side in FIG. 10) will be referred to as "second pixel electrode" and the suffix B will be added to the reference symbol. No suffixes will be added to the reference symbols when the pixel electrodes 110*g* are not differentiated but are collectively called. The first pixel electrode 110*g*A is connected to the first TFT 110*f*A and is charged to a predetermined voltage value (potential) based on an image signal supplied to the first source line 110*j*A. Similarly, the second pixel electrode 110*g*B is connected to the second TFT 110*f*B and is charged to a predetermined voltage value based on an image signal supplied to the second source line 110*j*B. On the side opposite to the first source line 110*j*A (the right side in FIG. 10) as a connection target to be connected to the first pixel electrode 110*g*A in the X-axis direction, the second pixel electrode 110*g*B connected to the second source line 110*j*B in another set aligned on the right side in FIG. 10 is disposed with respect to the first source line 110*j*A as a connection target. Similarly, on the side opposite to the second source line 110*j*B (the left side in FIG. 10) as a connection target to be connected to the second pixel electrode 110*g*B in the X-axis direction, the first pixel electrode 110*g*A connected to the first source line 110*j*A in another set aligned on the left side in FIG. 10 is disposed with respect to the second source line 110*j*B as a connection target. That is, among the large number of pixel electrodes 110*g* aligned along the X-axis direction, two pixel electrodes 110*g* adjacent to each other with the source line 110*j* interposed therebetween are connected to the first source line 10*j*A and the second source line 110*j*B adjacent to each other in the same set, whereas two pixel electrodes 110*g* adjacent to each other without the source line 110*j* interposed therebetween are connected to the first source line 10*j*A and the second source line 110*j*B in different sets not adjacent to each other in the X-axis direction. Therefore, the two pixel electrodes 110*g* aligned along the X-axis direction are sandwiched between the first source line 110*j*A and the second source line 110*j*B in different sets.

Figure 11:
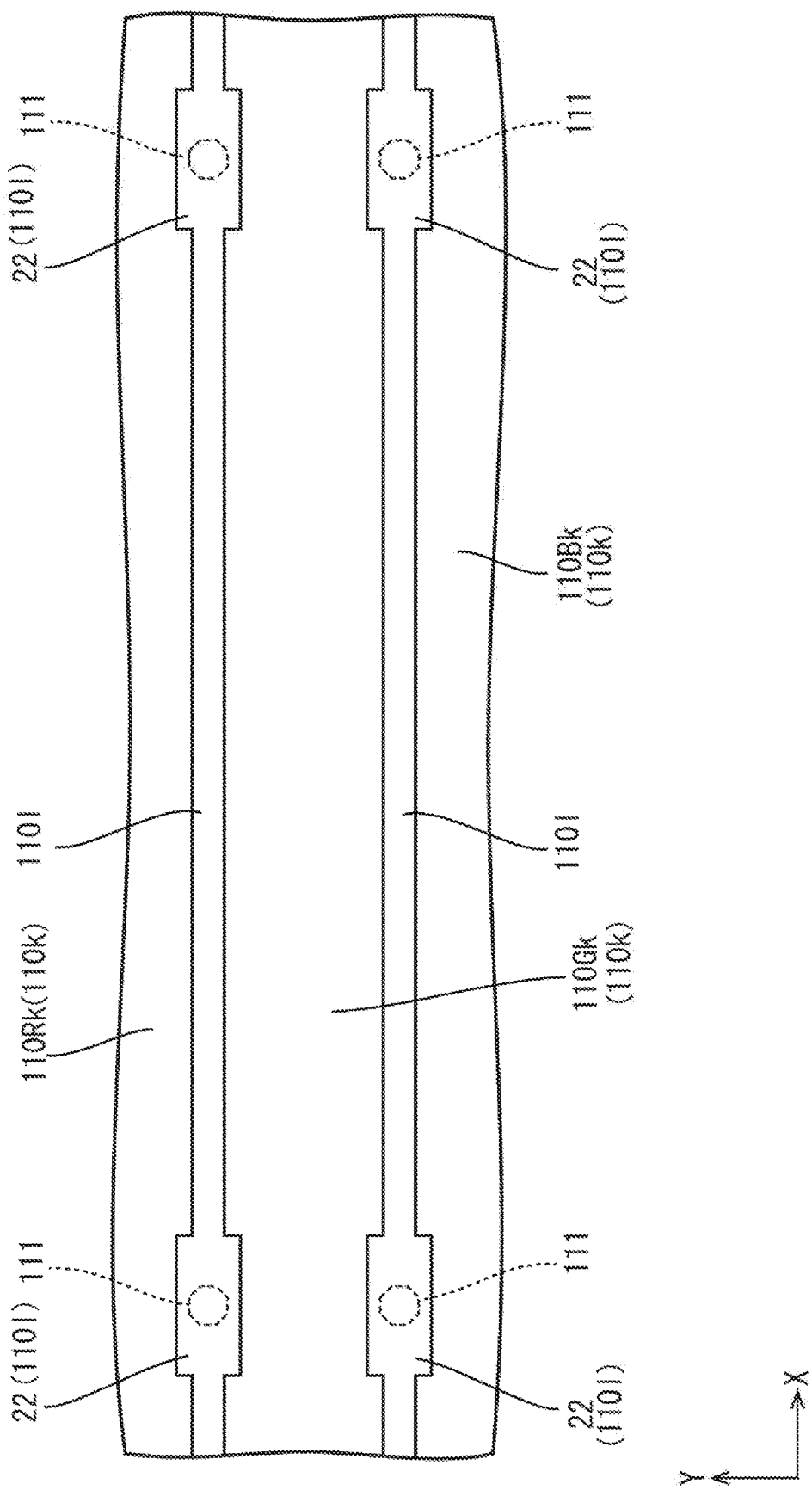
FIG. 11 is a plan view illustrating a configuration in a display area of a CF substrate.

As the array substrate 110*b* is configured as described above, the CF substrate 110*a* is configured as described below. That is, as illustrated in FIG. 11, color filters 110*k* are provided on the CF substrate 110*a* such that color filters 110*k* of three different colors extend along the X-axis direction and are repeatedly aligned along the Y-axis direction. The arrangement of the color filters 110*k* in the Y-axis direction matches the arrangement of the pixel electrodes 110*g* on the array substrate 110*b*. The color filters 110*k* constitute pixel parts 110RPX, 110GPX, and 110BPX in three colors of R, G, and B together with the opposed pixel electrodes 110*g*. Therefore, in the curved liquid crystal panel 110, the pixel parts 110RPX, 110GPX, and 110BPX of the three colors R, G, and B adjacent to each other along the Y-axis direction form display pixels for color display with a predetermined gradation. On the other hand, the color filters 110Rk, 110Gk, and 110Bk extend over almost the entire length of the display area along the X-axis direction and are disposed to straddle (traverse) all the large number of pixel electrodes 110*g* aligned along the X-axis direction. That is, the large number of pixel parts 110RPX, 110GPX, and 110BPX in the respective colors are disposed by the same color along the X-axis direction. Inter-pixel light shielding parts 110*l* are arranged to separate the color filters 110*k* adjacent to each other in the Y-axis direction, thereby to partition the pixel parts 110PX adjacent to each other in the Y-axis direction and exhibiting different colors. The inter-pixel light shielding parts 110*l* extend over almost the entire length of the display area along the X-axis direction and are arranged to overlap the gate lines 110*i* on the array substrate 110*b* in a plan view.

Figure 13:
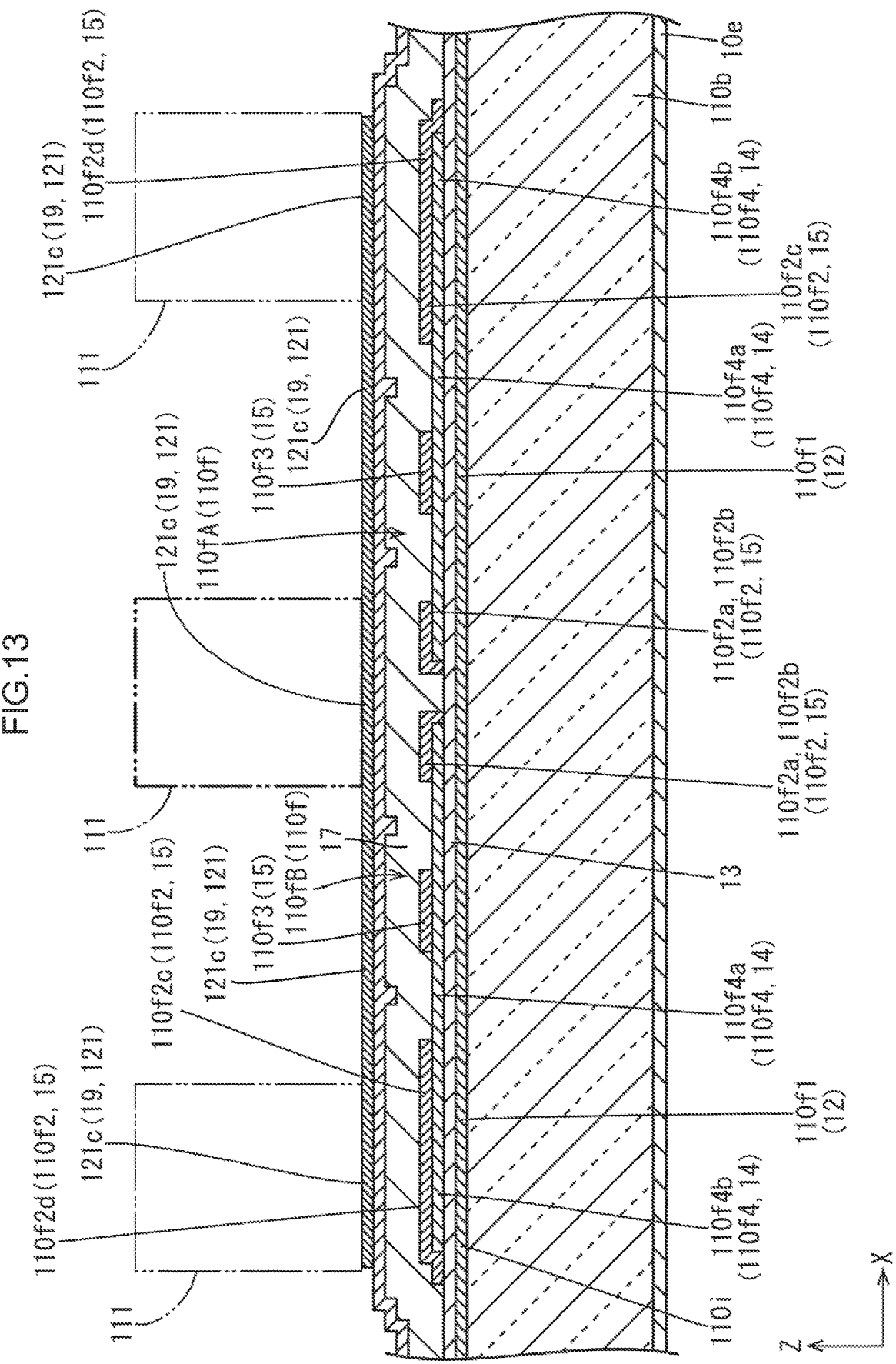
FIG. 13 is a cross-sectional view of FIG. 12 taken along line B-B.

As illustrated in FIGS. 12 and 13, each of the spacers 111 is disposed to overlap at least one of the first TFT 110*f*A and the second TFT 110*f*B adjacent to each other in the X-axis direction (curvature direction). According to this configuration, even when the curved liquid crystal panel 110 is curved around the curvature axis CAX from the flat state of the display surface 110DS during manufacture, the spacer 111 is less prone to contact the array substrate 110*b* at a position not overlapping the first TFT 110*f*A or the second TFT 110*f*B. Accordingly, the spacer 111 is highly likely to contact the array substrate 110*b* at a position overlapping either of the first TFT 100*f*A and the second TFT 110*f*B. Accordingly, as in the first embodiment, unevenness is less prone to occur in the image displayed on the display surface 110DS. Similarly to the first embodiment, all the spacers 111 dispersedly arranged in the plane of the display surface 110DS are in contact with the array substrate 110*b* at the intermediate position between the first TFT 100*f*A and the second TFT 110*f*B adjacent to each other in the X-axis direction before the curvature of the curved liquid crystal panel 110 in the manufacturing process. In FIGS. 12 and 13, the spacer 111 disposed closest to the curvature axis CAX as seen in the X-axis direction is indicated by a thick two-dot chain line, and the spacers 111 located at the farthest positions from the curvature axis CAX as seen in the X-axis direction, that is, the spacers 111 arranged at both end positions of the curved liquid crystal panel 110 as seen in the long side direction are indicated by thin two-dot chain lines.

Configurations of the first TFT 110*f*A and the second TFT 110*f*B will be described in detail. As illustrated in FIG. 12, the first TFT 110*f*A has a gate electrode 110*f*1 formed by projecting a portion of the gate line 110*i* intersecting with the first source line 110*j*A to both sides as seen in the Y-axis direction. The first TFT 110*f*A has a source electrode 110*f*2 formed by projecting a portion of the first source line 110*j*A intersecting with the gate electrode 110*f*1 of the first TFT 110*f*A to the side opposite to the second source line 110*j*B as seen in the X-axis direction (the left side in FIG. 12). On the other hand, the second TFT 10*f*B has a gate electrode 110*f*1 formed by projecting a portion of the gate line 110*i* intersecting with the second source line 110*j*B to both sides as seen in the Y-axis direction. The second TFT 110*f*B has a source electrode 110*f*2 formed by projecting a portion of the second source line 110*j*B intersecting with the gate electrode 110*f*1 of the second TFT 110*f*B to the side opposite to the first source line 110*j*A as seen in the X-axis direction (the right side in FIG. 12). Therefore, the source electrode 110*f*2 of the first TFT 100*f*A, the first source line 110*j*A, the second source line 110*j*B, and the source electrode 110*f*2 of the second TFT 110*f*B are linearly aligned in sequence along the X-axis direction. The arrangement range of these components is a range in which the flatness of the inner surface of the array substrate 110*b* is ensured, and a fluctuation allowable range of the contact position of the spacers 111 on the array substrate 110*b*. Therefore, it is possible to absorb variations in the positions of the spacers 111 in contact with the array substrate 110*b* due to the curvature of the curved liquid crystal panel 110 over a wider range, thereby stabilizing the space between the pair of substrates 110*a* and 110*b*. Further, scanning signals from the same (common) gate line 10*i* are supplied to the first TFT 110*f*A and the second TFT 110*f*B.

A configuration of the source electrodes 110*f*2 will be described in detail. As illustrated in FIG. 12, the source electrodes 110*f*2 is provided in such a manner as to be branched in the X-axis direction from the main body portion (linear portion along the Y-axis direction) of the source line 110*j*. Each of the source electrodes 110*f*2 includes: a first source electrode constituent portion 110*f*2*a* that is coupled to the main portion of the source line 110*j* and extends obliquely to the X-axis direction and the Y-axis direction at an acute angle with respect to the main portion; a second source electrode constituent portion 110*f*2*b* that is coupled to the main portion of the source line 110*j* and extends obliquely to the X-axis direction and the Y-axis direction at almost right angle with respect to the first source electrode constituent portion 110*f*2*a*; a third source electrode constituent portion 110*f*2*c* that is coupled to a protruding end of the second source electrode constituent portion 110*f*2*b*, is parallel to the first source electrode constituent portion 110*f*2*a* at almost right angle with respect to the second source electrode constituent portion 110*f*2*b*, and is opposed to the first source electrode constituent portion 110*f*2*a*; and a fourth source electrode constituent portion (source electrode extension portion) 110*f*2*d* that is coupled to a protruding end of the third source electrode constituent portion 110*f*2*c* and protrudes to a side opposite to the source line 110*j* side in parallel to the X-axis direction. Among the source electrodes 110*f*2, the first source electrode constituent portion 110*f*2*a*, the second source electrode constituent portion 110*f*2*b*, and the third source electrode constituent portion 110*f*2*c* overlap the gate electrode 110*f*1 (widened portion from the gate line 110*i*), whereas the fourth source electrode constituent portion 110*f*2*d* is arranged to protrude to the outside with respect to the gate electrode 110*f*1 and overlap a portion of the gate line 110*i*. The drain electrode 110*f*3 constituting the first TFT 100*f*A and the second TFT 110*f*B extends in parallel to the first source electrode constituent portion 110*f*2*a* and the third source electrode constituent portion 110*f*2*c* constituting the source electrode 110*f*2. The drain electrode 110*f*3 is positioned at almost equal space from the first source electrode constituent portion 110*f*2*a*, the second source electrode constituent portion 110*f*2*b*, and the third source electrode constituent portions 110*f*2*c*. The drain electrode 110*f*3 has an end portion led out from an opening between the protruding ends of the first source electrode constituent portion 110*f*2*a* and the third source electrode constituent portion 110*f*2*c* and connected to the pixel electrode 110*g*. In other respects, the drain electrode 110*f*3 is configured in the same manner as in the first embodiment.

The channel part 110*f*4 constituting the first TFT 110*f*A and the second TFT 110*f*B overlaps the gate electrode 110*f*1 and is sized to fall within the formation range of the source electrode 110*f*2 in a plan view. Specifically, the channel part 110*f*4 selectively has a portion that is positioned between the source electrode 110*f*2 and the drain electrode 110*f*3 as connection targets in a plan view and portions that overlap a portion of the source electrode 110*f*2 and a portion of the drain electrode 110*f*3. Accordingly, in the first embodiment, making the external light hard to apply to the semiconductor material to be the channel part 110*f*4 on the source electrode 110*f*2 makes it less prone to occur display defects even with fluctuations in the amount of irradiation light to the curved liquid crystal panel 110. In addition to the first channel constituent portion 110*f*4*a* that overlaps the gate electrode 110*f*1, the channel part 110*f*4 has a second channel constituent portion (channel extension portion) 110*f*4*b* that is a portion that projects outwardly with respect to the gate electrode 110*f*1 and overlaps a portion of the gate line 110*i*. The first channel constituent portion 110*f*4*a* overlaps a portion of the first source electrode constituent portion 110*f*2*a* and a portion of the third source electrode constituent portion 110*f*2*c* constituting the source electrode 110*f*2. On the other hand, the second channel constituent portion 110*f*4*b* is provided to protrude from the first channel constituent portion 110*f*4*a* along the X-axis direction toward the side opposite to the source line 110*j*, and overlaps most of the fourth source electrode constituent portion 110*f*2*d* constituting the source electrode 110*f*2. As described above, the source electrode 110*f*2 and the channel part 110*f*4 have the fourth source electrode constituent portion 110*f*2*d* and the second channel constituent portion 110*f*4*b* overlapping each other. Accordingly, the range in which the flatness of the inner surface of the array substrate 110*b* is extended by the fourth source electrode constituent portion 110*f*2*d* and the second channel constituent portion 110*f*4*b*. In addition, the fluctuation allowable range of the positions of the spacers 111 in contact with the array substrate 110*b* as seen in the X-axis direction is extended. Therefore, it is possible to absorb variations in the positions of the spacers 111 in contact with the array substrate 110*b* due to the curvature of the curved liquid crystal panel 110 over a wider range, thereby further stabilizing the space between the pair of substrates. The channel parts 110*f*4 constituting the first TFT 110*f*A and the second TFT 110*f*B are not coupled together unlike in the first embodiment described above. This is because the first TFT 110*f*A and the second TFT 110*f*B are driven by the same gate line 110*i* at the same timing, and thus if the channel parts 110*f*4 are coupled together, there occurs a short-circuit between the first source line 110*j*A and the second source line 110*j*B.

As illustrated in FIGS. 12 and 13, the light shielding part 121 is configured such that an inter-line light shielding part 121*a* disposed to straddle both the first source line 110*j*A and the second source line 110*j*B adjacent to each other in the X-axis direction, an array-side inter-electrode light shielding part 121*b* disposed to straddle both the source electrode 110*f*2 and the drain electrode 110*f*3 as connection targets, and a light shielding extension part 121*c* disposed to overlap the fourth source electrode constituent portion 110*f*2*d* and the second channel constituent portion 110*f*4*b* are connected together. The light shielding extension part 121*c* is provided to protrude from the array-side inter-electrode light shielding part 121*b* to the side opposite to the source line 110*j* along the X-axis direction. Accordingly, the flatness of the inner surface of the array substrate 110*b* is more preferably ensured, so that the spacers 111 more preferably exert the space keeping function. In FIG. 12, the formation range of the light shielding part 121 is indicated in shaded form.

As described above, according to the present embodiment, the array substrate 110*b* includes: the first source line (first line part) 110jA that extends along the direction intersecting with the curvature direction and is connected to the first TFT 100fA; and the second source line (second line part) 110jB that extends in parallel to the first source line 110jA, is disposed adjacent to the first source line 110jA with a space therebetween in the curvature direction, and is connected to the second TFT 110fB. Image signals are supplied to the first source line 110jA and the second source line 110jB. The first TFT 110fA and the second TFT 110fB have at least the source electrodes 110f2 respectively connected to the first source line 110jA and the second source line 110jB. The source electrode 110f2 of the first TFT 110fA is disposed adjacent to the first source line 110jA on the side opposite to the second source line 110jB as seen in the curvature direction. The source electrode 110f2 of the second TFT 110fB is disposed adjacent to the second source line 110jB on the side opposite to the first source line 110jA as seen in the curvature direction. Accordingly, when image signals are supplied to the first source line 110jA and the second source line 110jB, the image signals are supplied to the source electrodes 110f2 of the first TFT 100fA and the second TFT 110fB. The source electrodes 110f2 of the first TFT 100fA and the second TFT 110fB, the first source line 110jA, and the second source line 110jB are arranged along the curvature direction, and the arrangement range of these components constitutes the fluctuation allowable range of the positions of the spacers 111 with respect to the array substrate 110b. Therefore, it is possible to absorb variations in the positions of the spacers 111 with respect to the array substrate 110b due to the curvature of the curved liquid crystal panel 110 over a wider range, thereby further stabilizing the space between the pair of substrates 110a and 110b.

The array substrate 110b includes: the first pixel electrode 110gA that is disposed adjacent to the first source line 110jA on the side opposite to the second source line 110jB as seen in the curvature direction and is connected to the first TFT 110fA; and the second pixel electrode 110gB that is disposed adjacent to the second source line 110jB on the side opposite to the first source line 110jA as seen in the curvature direction and is connected to the second TFT 110fB. The first pixel electrode 110gA and the second pixel electrode 110gB have an approximately rectangular planar shape and are disposed such that the long side direction aligns with the curvature direction and the short side direction aligns with the extending direction of the first source line 110jA and the second source line 110jB, respectively. Accordingly, when the first source lines 110jA and the second source lines 110jB are disposed, for example, the space between the first source lines 110jA and the second source lines 110jB is determined based on the long side dimension of the first pixel electrode 110gA and the second pixel electrode 110gB. Therefore, the numbers of the first source lines 110jA and the second source lines 110jB in the curved liquid crystal panel 110 as seen in the curvature direction can be decreased as compared to a case where the long side direction of the first pixel electrode and the second pixel electrode aligns with the extending direction of the first source line 110jA and the second source line 110jB and the short side direction of the first pixel electrode and the second pixel electrode aligns with the curvature direction. As a result, the number of image signals supplied to the first source lines 110jA and the second source lines 110jB can be decreased to reduce the manufacturing cost of the curved liquid crystal panel 110.

The array substrate 110b also includes the gate line (third line part) 110i that extends along the curvature direction and is connected to the first TFT 110fA and the second TFT 110fB and to which a scanning signal is supplied. The first TFT 110fA and the second TFT 110fB have at least the channel part 110f4 that is made from a semiconductor material and is connected at least to the source electrode 110f2. The source electrode 110f2 and the channel part 110f4 have respectively the fourth source electrode constituent portion (source electrode extension portion) 110f2d and the second channel constituent portion (channel extension portion) 110f4b that extend along the curvature direction and overlap a portion of the gate line 110i. Accordingly, when the first TFT 110fA and the second TFT 110fB are driven based on scanning signals supplied to the gate line 110i, image signals supplied to the first source line 110jA and the second source line 110jB are supplied to the channel parts 110f4 of the first TFT 110fA and the second TFT 110fB. The source electrode 110f2 and the channel part 110f4 respectively have the fourth source electrode constituent portion 110f2d and the second channel constituent portion 110f4b that extend along the curvature direction and overlap a portion of the gate line 110i, which makes it possible to extend the fluctuation allowable range of the positions of the spacers 111 with respect to the array substrate 110b by the fourth source electrode constituent portion 110f2d and the second channel constituent portion 110f4b. Therefore, it is possible to absorb variations in the positions of the spacers 111 with respect to the array substrate 110b due to the curvature of the curved liquid crystal panel 110 over a wider range, thereby further stabilizing the space between the pair of substrates 110a and 110b.

Third Embodiment

A third embodiment of the present invention will be described with reference to FIGS. 14 to 17. The third embodiment is different from the second embodiment in that the light shielding part on the array substrate 210b is eliminated and a configuration of a CF-side inter-electrode light shielding part 222 on the CF substrate is changed. Duplicated descriptions of the same structures, operations, and advantageous effects as those of the second embodiment will be omitted.

Figure 14:
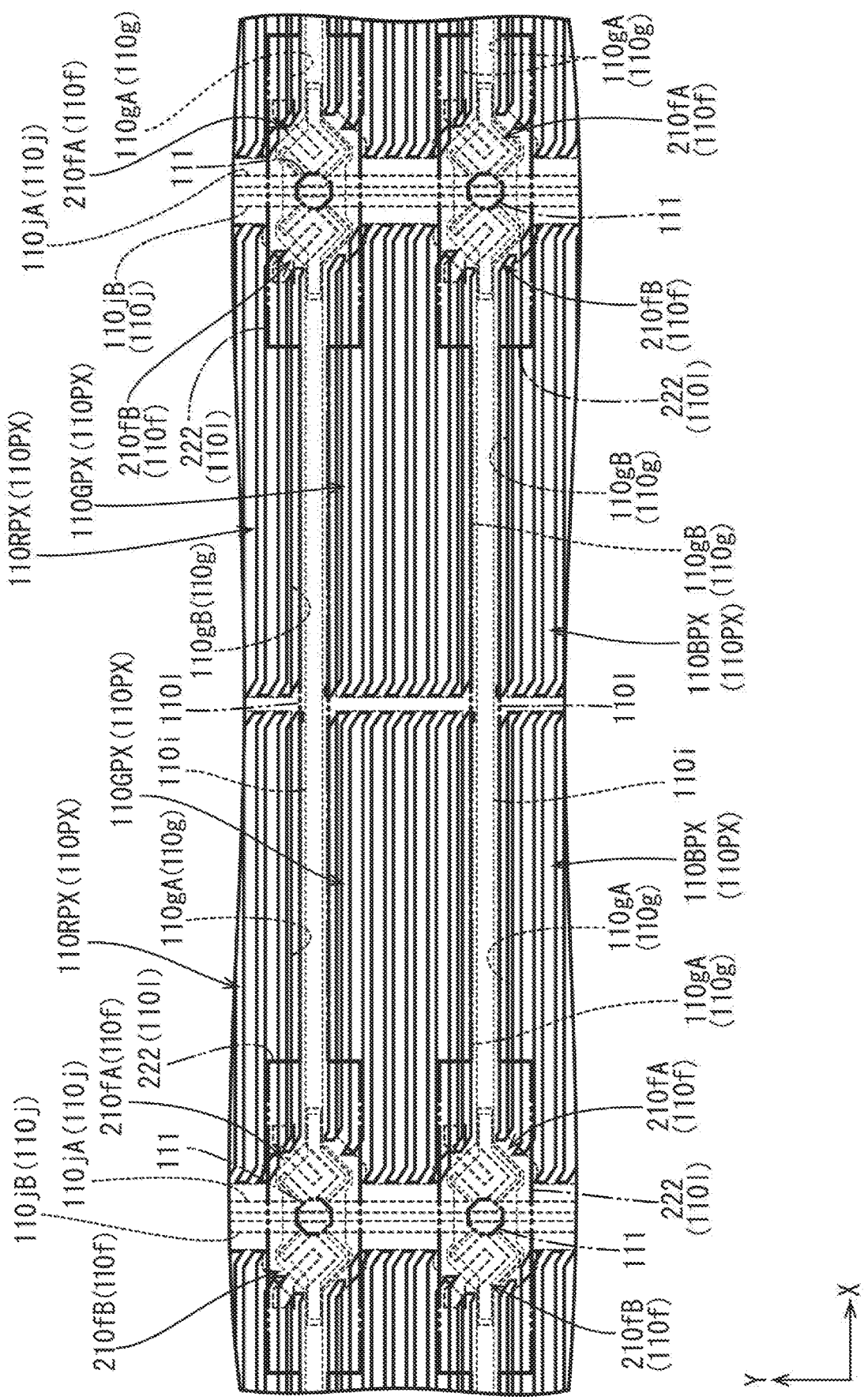
FIG. 14 is a plan view illustrating a line configuration in a display area of an array substrate constituting a curved liquid crystal panel according to a third embodiment of the present invention.
Figure 15:
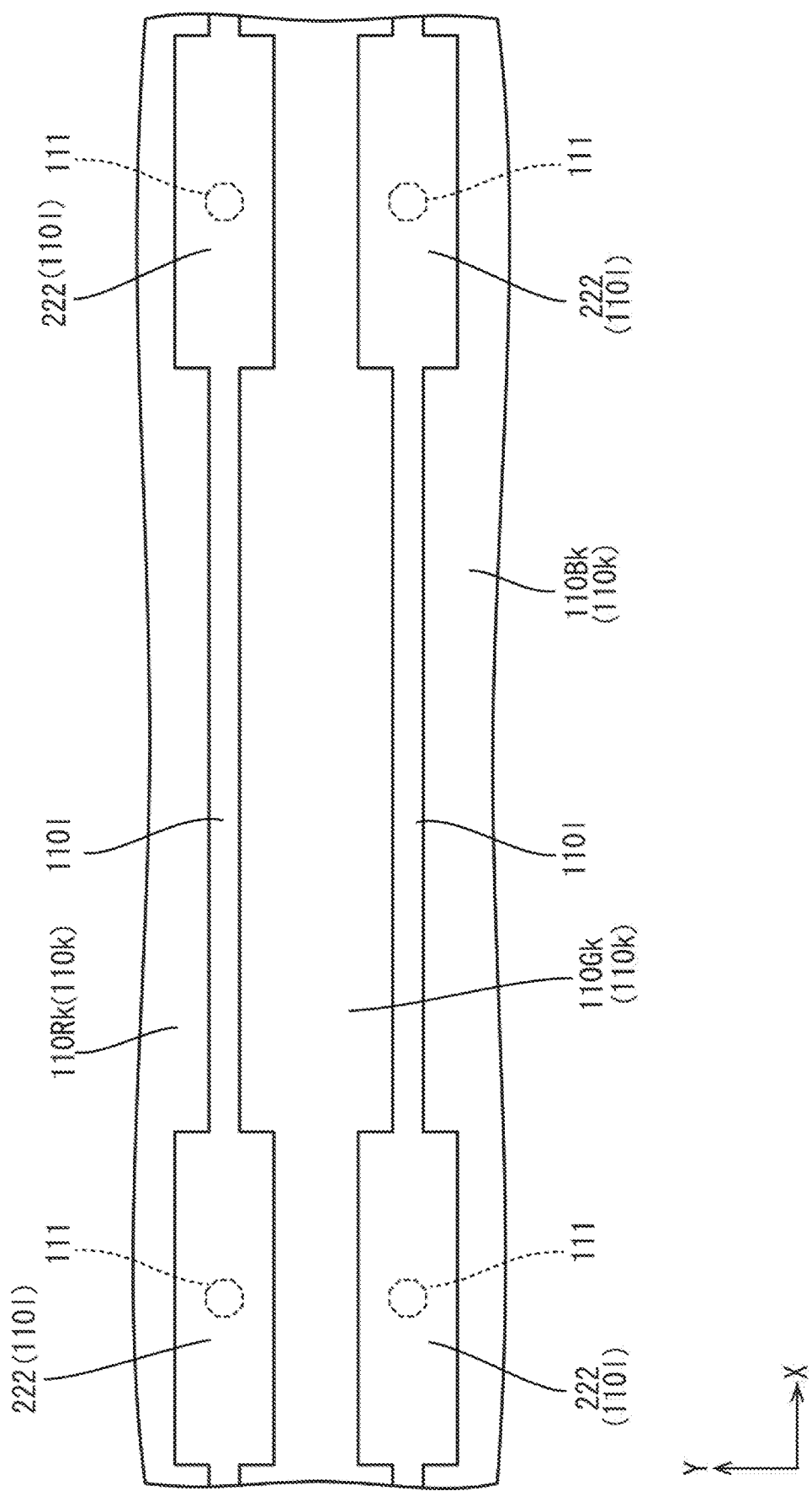
FIG. 15 is a plan view illustrating a configuration in a display area of a CF substrate.
Figure 16:
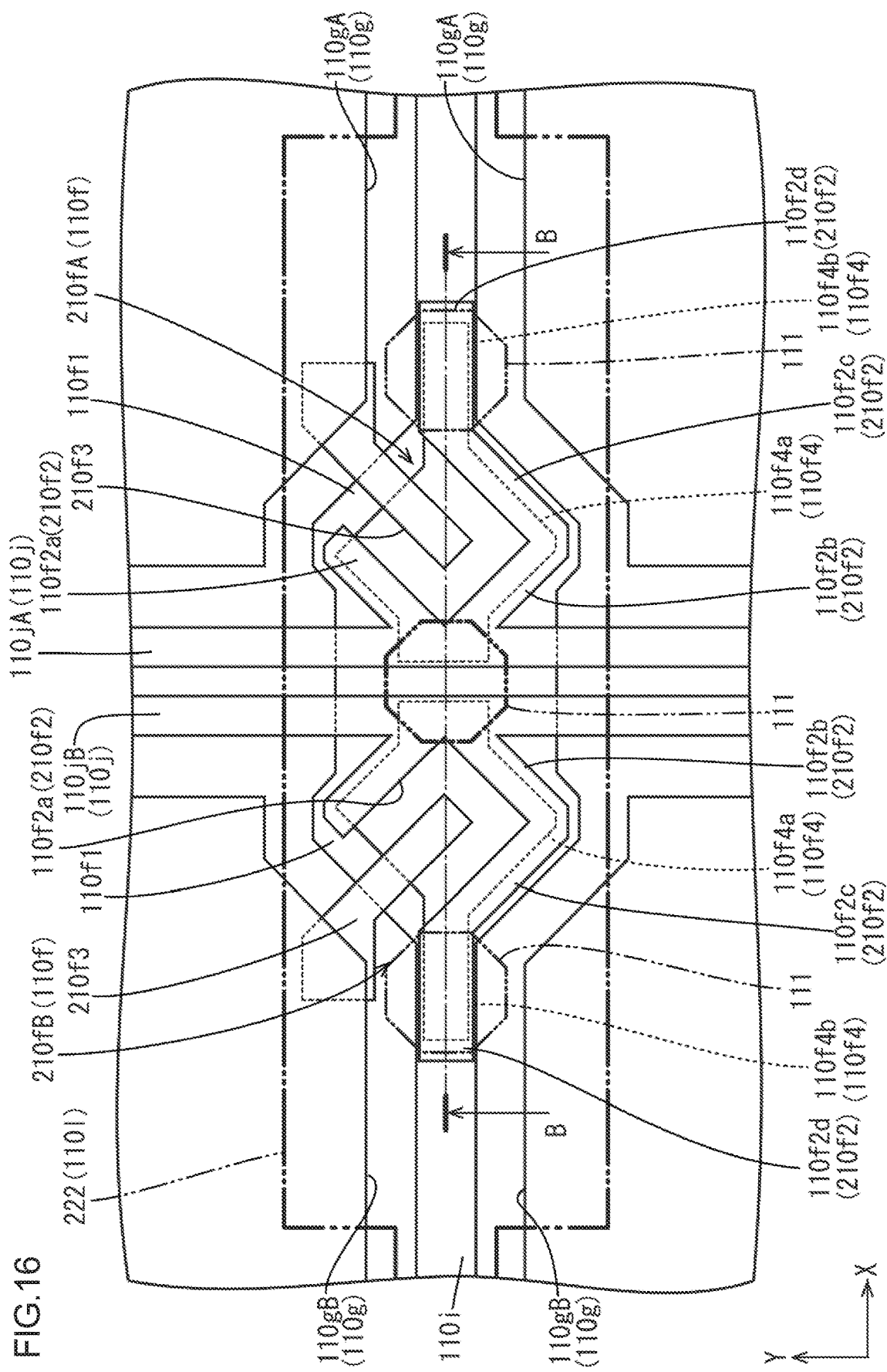
FIG. 16 is an enlarged plan view of TFTs and their vicinities in the display area of the array substrate.
Figure 17:
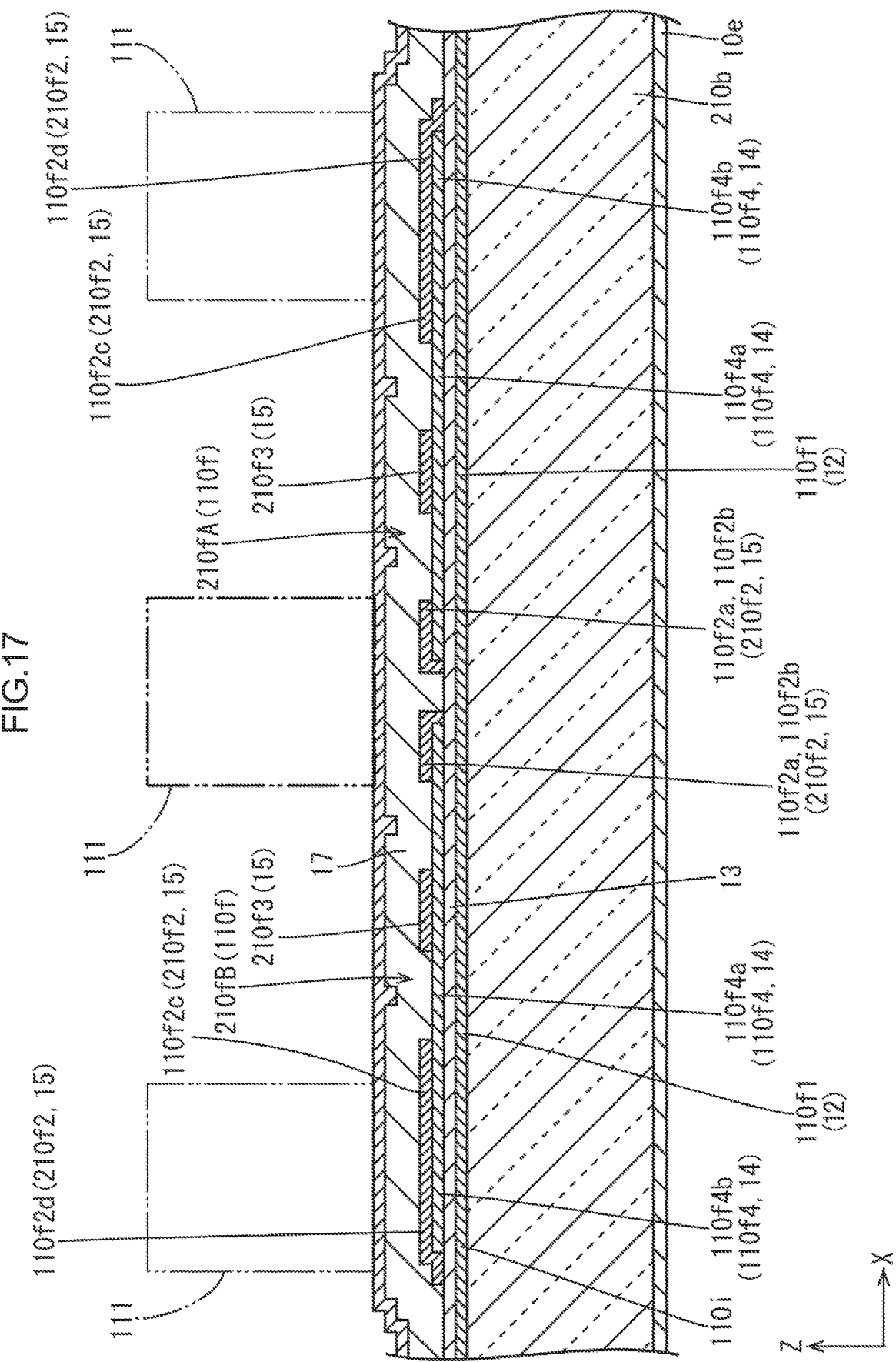
FIG. 17 is a cross-sectional view of FIG. 16 taken along line B-B.

As illustrated in FIGS. 14 and 15, the CF-side inter-electrode light shielding part 222 according to the present embodiment has a formation range larger than that in the second embodiment described above. Specifically, as illustrated in FIGS. 16 and 17, the CF-side inter-electrode light shielding part 222 is disposed to overlap not only the entire area of a portion between a source electrode 210f2 and a drain electrode 210f3 in the first TFT 210fA and the second TFT 210fB but also the entire areas of the source electrode 210f2 and the drain electrode 210f3 in a plan view. In other words, the CF-side inter-electrode light shielding part 222 extends along the X-axis direction to overlap substantially the entire areas of the first TFT 210fA and the second TFT 210fB. The extended length of the CF-side inter-electrode light shielding part 222 is set such that the CF-side inter-electrode light shielding part 222 overlaps the first TFT 210fA and the second TFT 210fB even when the position of the CF-side inter-electrode light shielding part 222 as seen in the X-axis direction with respect to the array substrate 210b changes due to the curving of the curved liquid crystal panel. Specifically, the CF-side inter-electrode light shielding part 222 overlaps the first TFT 210fA and the second TFT 210fB even when the position of the CF-side inter-electrode light shielding part 222 changes by 30 µm in the X-axis direction, for example, and changes by 5 µm in the Y-axis direction, for example, with respect to the array substrate 210*b* along with the curvature of the curved liquid crystal panel. According to this configuration, it is possible to preferably prevent light leakage in the vicinities of the first TFT 210*f*A and the second TFT 210*f*B even if the array substrate 210*b* is not provided with the light shielding part (the third metal film) as described above in relation to the second embodiment. Therefore, the number of the films laminated on the inner surface of the array substrate 210*b* can be reduced as compared to that in the second embodiment, thereby reducing the manufacturing cost of the array substrate 210*b*.

Fourth Embodiment

A fourth embodiment of the present invention will be described with reference to FIGS. 18 to 21. The fourth embodiment is different from the first embodiment in that the light shielding part on an array substrate 310*b* is eliminated from the first embodiment and a configuration of a CF-side inter-electrode light shielding part 322 on the CF substrate is changed as in the third embodiment. Duplicated descriptions of the same structures, operations, and advantageous effects as those of the first embodiment will be omitted.

Figure 18:
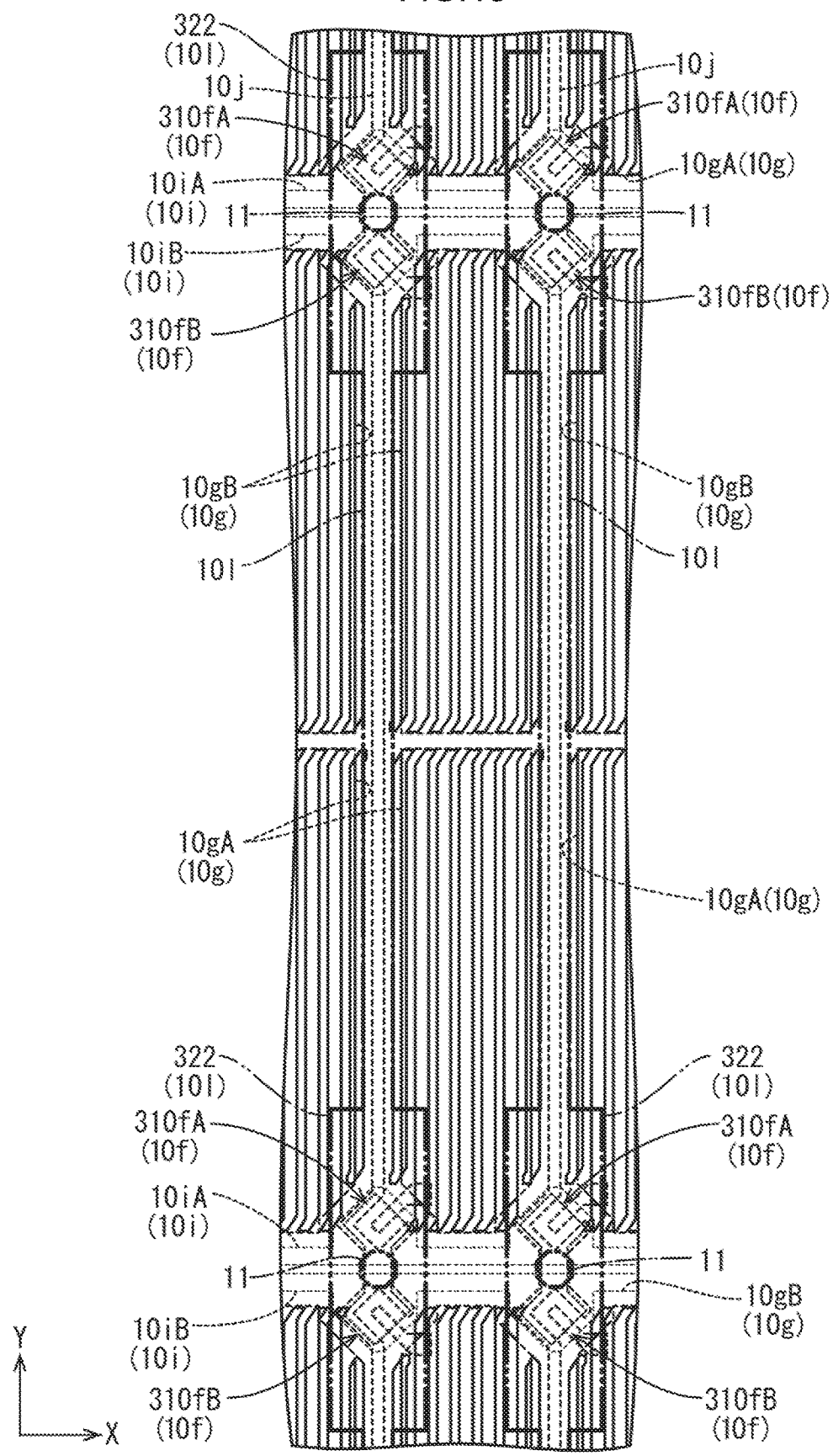
FIG. 18 is a plan view illustrating a line configuration in a display area of an array substrate constituting a curved liquid crystal panel according to a fourth embodiment of the present invention.
Figure 19:
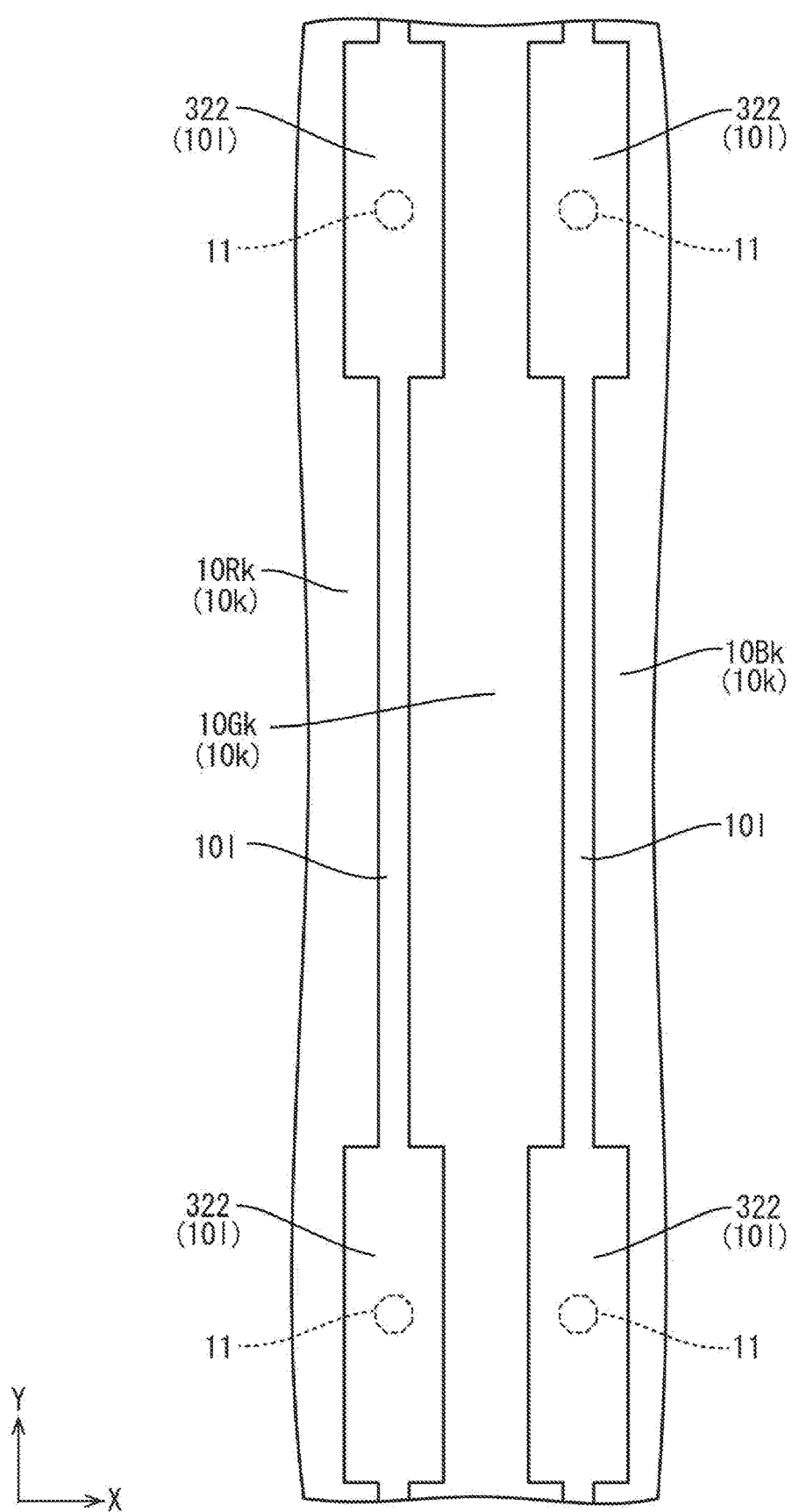
FIG. 19 is a plan view illustrating a configuration in a display area of a CF substrate.
Figure 20:
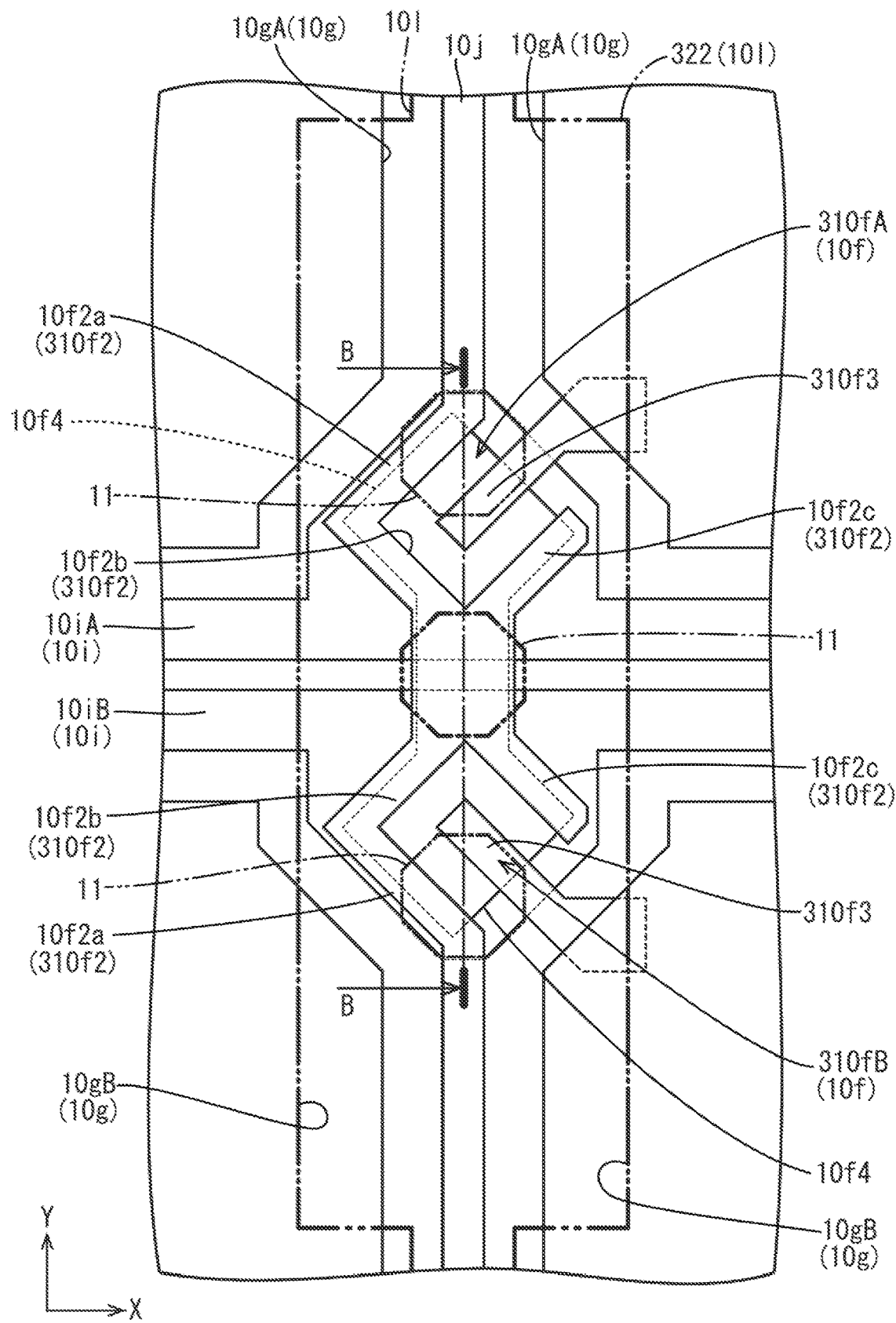
FIG. 20 is an enlarged plan view of TFTs and their vicinities in the display area of the array substrate.
Figure 21:
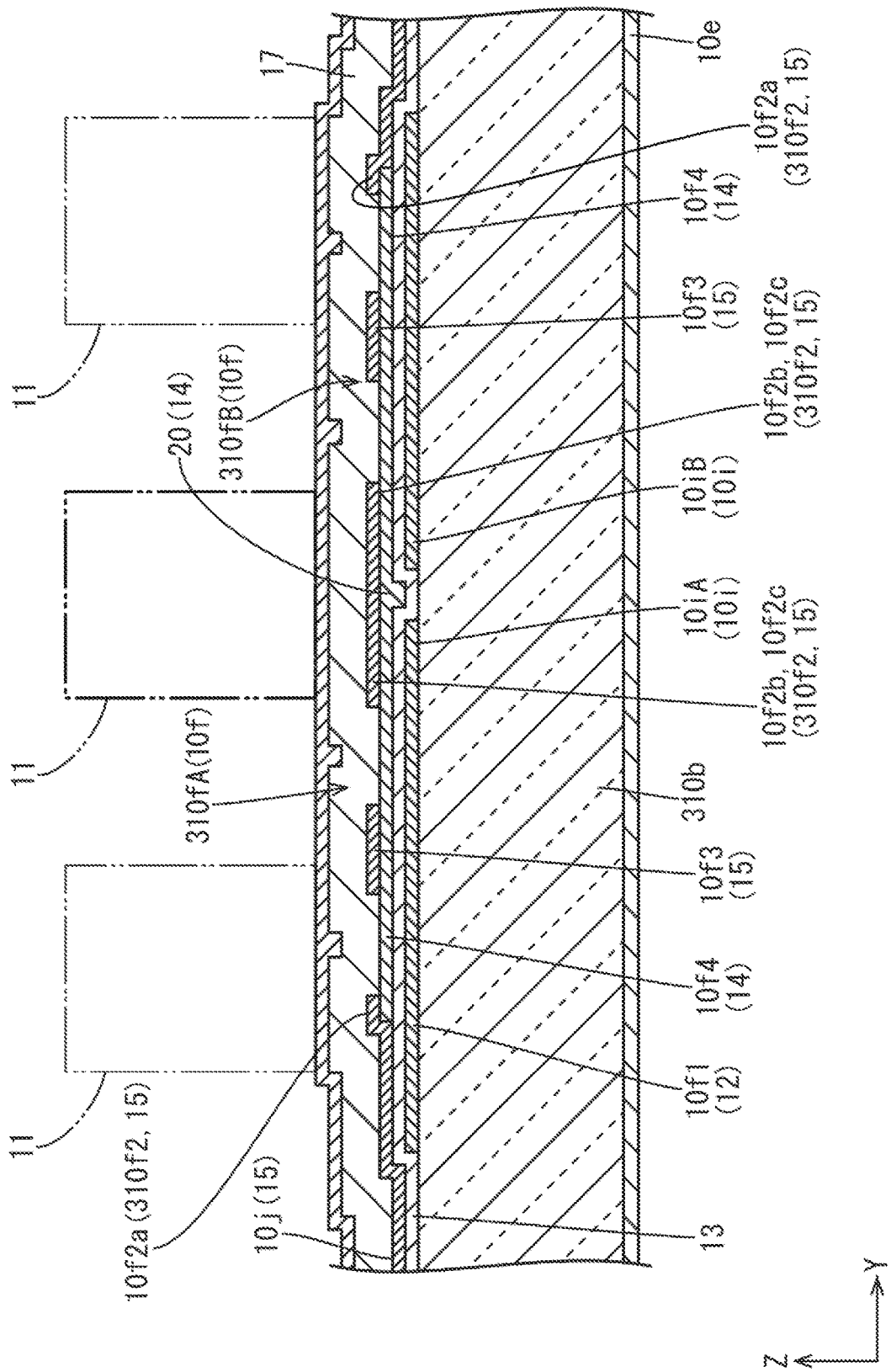
FIG. 21 is a cross-sectional view of FIG. 20 taken along line B-B.

As illustrated in FIGS. 18 and 19, the CF-side inter-electrode light shielding part 322 according to the present embodiment has a formation range larger than that in the first embodiment described above. Specifically, as illustrated in FIGS. 20 and 21, the CF-side inter-electrode light shielding part 322 is disposed to overlap not only the entire area of a portion between a source electrode 310*f*2 and a drain electrode 310*f*3 in the first TFT 310*f*A and the second TFT 310*f*B but also the entire areas of the source electrode 310*f*2 and the drain electrode 310*f*3 in a plan view. In other words, the CF-side inter-electrode light shielding part 322 extends along the Y-axis direction to overlap substantially the entire areas of the first TFT 310*f*A and the second TFT 310*f*B. According to this configuration, the same actions and advantageous effects as those of the third embodiment can be obtained.

Other Embodiments

The present invention is not limited to the embodiments described above and illustrated in the drawings. For example, the following embodiments also are within the technical scope of the present invention:

(1) In each of the embodiments described above, the curved liquid crystal panel curved around the one curvature axis is provided. Alternatively, a curved liquid crystal panel may be curved around curvature axes. In that case, the curvature axes may be parallel to one another and separated from one another in the curvature direction, or may intersect with one another. In the case of designing the curvature axes to intersect with one another, two TFTs are preferably aligned along the curvature direction such that the amount of displacement of the spacers becomes maximal due to the curvature of the curved liquid crystal panel and the spacers overlap at least one of the two TFTs.

(2) In each of the embodiments described above, the spacer disposed closest to the curvature axis as seen in the curvature direction is in contact at the intermediate position between the first TFT and the second TFT. Alternatively, the spacer disposed closest to the curvature axis as seen in the curvature direction may be in contact at a position different from the intermediate position between the first TFT and the second TFT as seen in the curvature direction.

(3) In each of the embodiments described above, the space between the first TFT and the second TFT is smaller than the diameter of the spacer. Alternatively, the space between the first TFT and the second TFT may be identical to or larger than the diameter of the spacer.

(4) In each of the embodiments described above, the space between the source electrode and the drain electrode in the TFT is smaller than the diameter of the spacer. Alternatively, the space between the source electrode and the drain electrode in the TFT may be identical to or larger than the diameter of the spacer.

(5) Besides the embodiments described above, the specific formation range of the channel part and the semiconductor material continuous with the channel part in the TFT can be changed as appropriate. For example, the semiconductor material continuous with the channel part may be formed in a range wider than the formation range of the source electrode.

(6) In the first and second embodiments, the light shielding part formed from the third metal film is disposed on the upper layer side of the common electrode and is in direct contact with the common electrode. Alternatively, the light shielding part may be disposed on the lower layer side of the common electrode and may be in direct contact with the common electrode. In addition, the light shielding part may be provided on a layer which is not in direct contact with the common electrode. For example, an insulating film may be formed between the light shielding part and the common electrode, and a contact hole for connecting the light shielding part and the common electrode may be formed in the insulating film.

(7) In the first and second embodiments, the light shielding part is made of the third metal film. Alternatively, the light shielding part may be made of a light shielding material other than a metal material.

(8) In the configurations of the first and second embodiments, the CF-side inter-electrode light shielding part may be eliminated, so that the inter-pixel light shielding part is not increased in width in the middle.

(9) In the first and fourth embodiments, the channel parts of the first TFT and the second TFT are connected together. Alternatively, the channel parts of the first TFT and the second TFT may be separated and independent from each other.

(10) In each of the embodiments described above, the curved liquid crystal panel has a rectangular planar shape. Alternatively, the curved liquid crystal panel may have a planar shape other than a rectangular shape, such as a regular square, a circle, a semicircle, an ellipse, a semi-ellipse, or a trapezoid.

(11) In FIGS. 1 and 9 used in the description of the first and second embodiments, the curvature axis CAX is disposed on the array substrate (active matrix substrate, TFT substrate) 10*b* (the array substrate 10*b* is closer to the curvature axis CAX than the CF substrate 10*a*) as seen in the Z-axis direction. Alternatively, the curvature axis CAX may be disposed on the CF substrate (opposed substrate) 10*a* (the CF substrate 10*a* is closer to the curvature axis CAX than the array substrate 10*b*) as seen in the Z-axis direction.

(12) In each of the embodiments described above, the operation mode of the curved liquid crystal panel is the FFS mode. However, the present invention can be carried out in a twisted nematic (TN) mode in which dielectric constant anisotropy aligns positive liquid crystal in a state twisted by approximately 90° as viewed from a substrate normal direction or in a vertical alignment (VA) mode in which dielectric constant anisotropy aligns negative liquid crystal such that a long axis of liquid crystal molecules is vertical to a substrate surface.

EXPLANATION OF SYMBOLS

- 10, 110: Curved liquid crystal panel (Curved display panel)
- 10DS, 110DS: Display surface
- 10a, 110a: CF substrate (Second substrate)
- 10b, 110b, 210b, 310b: Array substrate (First substrate)
- 10fA, 110fA, 210fA, 310fA: First TFT (First switching element)
- 10fB, 110fB, 210fB, 310fB: Second TFT (Second switching element)
- 10f1, 110f1: Gate electrode
- 10f2, 110f2, 210f2, 310f2: Source electrode
- 10f3, 110f3, 210f3, 310f3: Drain electrode
- 10f4, 110f4: Channel part
- 10gA, 110gA: First pixel electrode
- 10gB, 110gB: Second pixel electrode
- 10h: Common electrode
- 10iA: First gate line (First line part)
- 10iB: Second gate line (Second line part)
- 10k, 110k: Color filter
- 11, 111: Spacer
- 13: Gate insulating film (Insulating film)
- 17: Inter-layer insulating film (Insulating film)
- 21a, 121a: Inter-line light shielding part
- 21b, 121b: Array-side inter-electrode light shielding part (One-side inter-electrode light shielding part)
- 22, 222, 322: CF-side inter-electrode light shielding part (Other-side inter-electrode light shielding part)
- 110f2d: Fourth source electrode constituent portion (Source electrode extension portion)
- 110f4b: Second channel constituent portion (Channel extension portion)
- 110i: Gate line (Third line part)
- 110jA: First source line (First line part)
- 110jB: Second source line (Second line part)
- CAX: Curvature axis (One curvature axis)

The invention claimed is:

1. A curved display panel having a display surface displaying an image, the display surface being curved around at least one curvature axis, the curved display panel comprising:
    a pair of substrates disposed such that plate surfaces thereof are opposed to each other with a space therebetween;
    a first switching element provided on a first substrate of the pair of substrates;
    a second switching element that is provided on the first substrate and is disposed adjacent to the first switching element in a curvature direction orthogonal to the one curvature axis and along the display surface; and
    a spacer that is provided on a second substrate of the pair of substrates to keep a space between the pair of substrates and is disposed to overlap at least one of the first switching element and the second switching element that are adjacent to each other,
    wherein each of the first switching element and the second switching element includes at least:
    a source electrode to which an image signal is supplied;
    a channel part that is made of a semiconductor material and is connected to the source electrode; and
    a drain electrode that is disposed with a space from the source electrode and is connected to the channel part, and
    the source electrode and the drain electrode are connected together via the channel part while having the space therebetween and the space is smaller than a dimension of the spacer as seen in the curvature direction.

2. The curved display panel according to claim 1, wherein the spacer includes spacers that are disposed dispersedly within a plane area of the display surface, and
    one spacer of the spacers disposed closest to the one curvature axis as seen in the curvature direction is located on the first substrate at an intermediate position between the first switching element and the second switching element that are adjacent to each other.

3. The curved display panel according to claim 1, wherein the first switching element and the second switching element that are adjacent to each other are disposed with a space therebetween, and
    the space is smaller than the dimension of the spacer as seen in the curvature direction.

4. The curved display panel according to claim 1, wherein the first substrate includes:
    a first line part that extends along a direction intersecting with the curvature direction and is connected to the first switching element;
    a second line part that extends in parallel to the first line part and is disposed adjacent to the first line part with a space left from the first line part in the curvature direction and is connected to the second switching element; and
    an inter-line light shielding part that extends in parallel to the first line part and the second line part and is disposed to straddle both the first line part and the second line part.

5. The curved display panel according to claim 4, wherein the first substrate includes:
    a first pixel electrode that is disposed adjacent to the first line part on a side opposite to the second line part as seen in the curvature direction and is connected to the first switching element;
    a second pixel electrode that is disposed adjacent to the second line part on a side opposite to the first line part as seen in the curvature direction and is connected to the second switching element; and
    a common electrode that is disposed to overlap the first pixel electrode and the second pixel electrode while having an insulating film therebetween and to which a reference potential is supplied, and
    the inter-line light shielding part is made of a light-shielding and electrically-conductive material and is disposed in contact with the common electrode.

6. The curved display panel according to claim 1, wherein the first substrate includes a one-side inter-electrode light shielding part that is disposed to straddle both the source electrode and the drain electrode.

7. The curved display panel according to claim 1, wherein the second substrate includes an other-side inter-electrode light shielding part that is arranged to overlap a range straddling both the source electrode and the drain electrode.

8. The curved display panel according to claim 1, wherein the first substrate includes a first pixel electrode and a second pixel electrode that are respectively connected to the first switching element and the second switching element and are aligned along the curvature direction, and the first pixel electrode and the second pixel electrode include first pixel electrodes and second pixel electrodes that are aligned along a direction intersecting with the curvature direction, and the second substrate includes a plurality of color filters of different colors that are aligned along a direction intersecting with the curvature direction to overlap the first pixel electrodes and the second pixel electrodes, and the plurality of color filters extend along the curvature direction and are disposed to straddle the first pixel electrodes and the second pixel electrodes.

9. The curved display panel according to claim 1, wherein the first substrate includes:
   a first line part that extends along a direction intersecting with the curvature direction and is connected to the first switching element; and
   a second line part that extends in parallel to the first line part and is disposed adjacent to the first line part with a space left from the first line part in the curvature direction and is connected to the second switching element, and
   the first line part and the second line part are each supplied with a scanning signal,
   the first switching element and the second switching element have at least a gate electrode connected to the first line part and the second line part, and
   the gate electrode of the first switching element is disposed adjacent to the first line part on a side opposite to the second line part as seen in the curvature direction, and
   the gate electrode of the second switching element is disposed adjacent to the second line part on a side opposite to the first line part as seen in the curvature direction.

10. The curved display panel according to claim 9, wherein
    the first switching element and the second switching element are disposed with a space therebetween,
    each of the first switching element and the second switching element overlaps the gate electrode with an insulating film therebetween, and
    the channel part of the first switching element and the channel part of the second switching element are coupled with each other.

11. The curved display panel according to claim 9, wherein
    the channel part overlaps the gate electrode via an insulating film;
    and
    the channel part selectively has:
    a portion positioned between the source electrode and the drain electrode as connection targets; and
    a portion overlapping at least a portion of the source electrode and a portion of the drain electrode.

12. A curved display panel having a display surface displaying an image, the display surface being curved around at least one curvature axis, the curved display panel comprising:
    a pair of substrates disposed such that plate surfaces thereof are opposed to each other with a space therebetween;
    a first switching element provided on a first substrate of the pair of substrates;
    a second switching element that is provided on the first substrate and is disposed adjacent to the first switching element in a curvature direction orthogonal to the one curvature axis and along the display surface; and
    a spacer that is provided on a second substrate of the pair of substrates to keep a space between the pair of substrates and is disposed to overlap at least one of the first switching element and the second switching element that are adjacent to each other, wherein
    each of the first switching element and the second switching element has at least:
       a source electrode to which an image signal is supplied;
       a channel part that is made of a semiconductor material and connected to the source electrode; and
       a drain electrode that is disposed with a space from the source electrode and is connected to the channel part, and
    the second substrate includes an other-side inter-electrode light shielding part that is arranged to overlap a range straddling both the source electrode and the drain electrode.

13. The curved display panel according to claim 12, wherein the first substrate includes:
    a first line part that extends along a direction intersecting with the curvature direction and is connected to the first switching element;
    a second line part that extends in parallel to the first line part and is disposed adjacent to the first line part with a space left from the first line part in the curvature direction and is connected to the second switching element; and
    an inter-line light shielding part that extends in parallel to the first line part and the second line part and is disposed to straddle both the first line part and the second line part.

14. The curved display panel according to claim 12, wherein
    the first substrate includes a one-side inter-electrode light shielding part that is disposed to straddle both the source electrode and the drain electrode.

15. The curved display panel according to claim 12, wherein
    the first substrate includes:
       a first line part that extends along a direction intersecting with the curvature direction and is connected to the first switching element; and
       a second line part that extends in parallel to the first line part and is disposed adjacent to the first line part with a space left from the first line part in the curvature direction and is connected to the second switching element, and
       the first line part and the second line part are each supplied with a scanning signal,
    the first switching element and the second switching element have at least a gate electrode connected to the first line part and the second line part, and
    the gate electrode of the first switching element is disposed adjacent to the first line part on a side opposite to the second line part as seen in the curvature direction, and
    the gate electrode of the second switching element is disposed adjacent to the second line part on a side opposite to the first line part as seen in the curvature direction.

16. A curved display panel having a display surface displaying an image, the display surface being curved around at least one curvature axis, the curved display panel comprising:
    a pair of substrates disposed such that plate surfaces thereof are opposed to each other with a space therebetween;

a first switching element provided on a first substrate of the pair of substrates;
a second switching element that is provided on the first substrate and is disposed adjacent to the first switching element in a curvature direction orthogonal to the one curvature axis and along the display surface; and
a spacer that is provided on a second substrate of the pair of substrates to keep a space between the pair of substrates and is disposed to overlap at least one of the first switching element and the second switching element that are adjacent to each other, wherein
the first substrate includes a first pixel electrode and a second pixel electrode that are respectively connected to the first switching element and the second switching element and are aligned along the curvature direction, and the first pixel electrode and the second pixel electrode include first pixel electrodes and second pixel electrodes that are aligned along a direction intersecting with the curvature direction, and
the second substrate includes a plurality of color filters of different colors that are aligned along a direction intersecting with the curvature direction to overlap the first pixel electrodes and the second pixel electrodes, and the plurality of color filters extend along the curvature direction and are disposed to straddle the first pixel electrodes and the second pixel electrodes.

17. The curved display panel according to claim 16, wherein the first substrate includes:
a first line part that extends along a direction intersecting with the curvature direction and is connected to the first switching element;
a second line part that extends in parallel to the first line part and is disposed adjacent to the first line part with a space left from the first line part in the curvature direction and is connected to the second switching element; and
an inter-line light shielding part that extends in parallel to the first line part and the second line part and is disposed to straddle both the first line part and the second line part.

18. The curved display panel according to claim 16, wherein
each of the first switching element and the second switching element has at least:
a source electrode to which an image signal is supplied;
a channel part that is made of a semiconductor material and is connected to the source electrode; and
a drain electrode that is disposed with a space left from the source electrode and is connected to the channel part, and
the first substrate includes a one-side inter-electrode light shielding part that is disposed to straddle both the source electrode and the drain electrode.

19. The curved display panel according to claim 16, wherein
the first substrate includes:
a first line part that extends along a direction intersecting with the curvature direction and is connected to the first switching element; and
a second line part that extends in parallel to the first line part and is disposed adjacent to the first line part with a space left from the first line part in the curvature direction and is connected to the second switching element, and
the first line part and the second line part are each supplied with a scanning signal,
the first switching element and the second switching element have at least a gate electrode connected to the first line part and the second line part, and
the gate electrode of the first switching element is disposed adjacent to the first line part on a side opposite to the second line part as seen in the curvature direction, and
the gate electrode of the second switching element is disposed adjacent to the second line part on a side opposite to the first line part as seen in the curvature direction.

* * * * *